US012710175B2

(12) United States Patent
Naik et al.

(10) Patent No.: US 12,710,175 B2
(45) Date of Patent: Aug. 18, 2026

(54) COMBUSTION SECTION FOR A TURBINE ENGINE

(71) Applicant: GENERAL ELECTRIC COMPANY, Evendale, OH (US)

(72) Inventors: Pradeep Naik, Bengaluru (IN); Prithiviraaj Pet T, Madurai (IN); Pabitra Badhuk, Jhargram (IN); Karthikeyan Sampath, Bengaluru (IN); Aritra Chakraborty, Kolkata (IN); Michael T. Bucaro, Arvada, CO (US); Michael A. Benjamin, Cincinnati, OH (US); Sibtosh Pal, Mason, OH (US); Clayton Stuart Cooper, Loveland, OH (US); Narasimha Chiranthan Ranganatha, Bengaluru (IN); Joseph Zelina, Waynesville, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/039,256

(22) Filed: Jan. 28, 2025

(65) Prior Publication Data

US 2026/0218907 A1 Jul. 30, 2026

(51) Int. Cl.

| | |
|---|---|
| ***F23R 3/28*** | (2006.01) |
| ***F23R 3/12*** | (2006.01) |
| ***F23R 3/14*** | (2006.01) |

(52) U.S. Cl.

CPC ................ *F23R 3/286* (2013.01); *F23R 3/12* (2013.01); *F23R 3/14* (2013.01); *F05D 2250/15* (2013.01); *F05D 2260/14* (2013.01); *F23R 2900/03341* (2013.01)

(58) Field of Classification Search

CPC .... F23R 3/12; F23R 3/14; F23R 3/286; F23R 2900/03341; F05D 2260/14; F05D 2250/15

See application file for complete search history.

(56) References Cited

U.S. PATENT DOCUMENTS

| | | | |
|---|---|---|---|
| 3,905,192 | A | 9/1975 | Pierce et al. |
| 5,165,241 | A | 11/1992 | Joshi et al. |
| 5,590,529 | A | 1/1997 | Joshi et al. |

(Continued)

FOREIGN PATENT DOCUMENTS

| | | | |
|---|---|---|---|
| CN | 116878029 | A | 10/2023 |
| JP | H08158892 | A | 6/1996 |

(Continued)

OTHER PUBLICATIONS

Extended European Search Report issued in corresponding application 26150686.9 dated May 20, 2026.

*Primary Examiner* — Jason H Duger

(74) *Attorney, Agent, or Firm* — Carter, DeLuca & Farrell LLP

(57) ABSTRACT

A combustion section for a turbine engine. The combustion section has a wall and a fuel nozzle. The wall at least partially forms a combustion chamber. The fuel nozzle opens to the combustion chamber through the wall. The fuel nozzle has a fuel nozzle body and a swirler. The fuel nozzle body defines a central channel. The swirler is provided within the central channel.

18 Claims, 24 Drawing Sheets

(56) References Cited

U.S. PATENT DOCUMENTS

| | | | | |
|---|---|---|---|---|
| 6,272,842 | B1 * | 8/2001 | Dean | F23R 3/14<br>60/725 |
| 6,360,525 | B1 * | 3/2002 | Senior | F23R 3/12<br>60/776 |
| 6,550,251 | B1 | 4/2003 | Stickles et al. | |
| 7,416,404 | B2 * | 8/2008 | Chan | C10J 3/30<br>366/175.2 |
| 8,006,500 | B1 | 8/2011 | Wilson, III | |
| 8,220,271 | B2 * | 7/2012 | Poyyapakkam | F23R 3/28<br>60/737 |
| 8,522,555 | B2 | 9/2013 | Berry et al. | |
| 8,607,569 | B2 | 12/2013 | Helmick et al. | |
| 8,850,821 | B2 | 10/2014 | Khan et al. | |
| 9,557,061 | B2 | 1/2017 | Biagioli et al. | |
| 11,454,396 | B1 | 9/2022 | Boardman et al. | |
| 11,835,235 | B1 * | 12/2023 | Strzpek | F23R 3/12 |
| 2004/0020210 | A1 * | 2/2004 | Tanaka | F23R 3/14<br>60/740 |
| 2006/0231645 | A1 | 10/2006 | Chan | |
| 2006/0236700 | A1 | 10/2006 | Saitoh et al. | |
| 2009/0272821 | A1 | 11/2009 | Guo et al. | |
| 2010/0162711 | A1 | 7/2010 | Zuo et al. | |
| 2011/0023494 | A1 * | 2/2011 | Butler | F23R 3/14<br>60/748 |
| 2012/0180487 | A1 | 7/2012 | Uhm et al. | |
| 2013/0067920 | A1 * | 3/2013 | Fox | F02C 7/22<br>60/738 |
| 2014/0238026 | A1 * | 8/2014 | Boardman | F02C 7/24<br>60/742 |
| 2017/0350598 | A1 * | 12/2017 | Boardman | F23R 3/14 |
| 2018/0340688 | A1 | 11/2018 | Kapilavai et al. | |
| 2020/0041131 | A1 | 2/2020 | Boyce et al. | |
| 2022/0003415 | A1 | 1/2022 | Shershnyov et al. | |
| 2023/0130173 | A1 * | 4/2023 | Versailles | F23R 3/286<br>60/737 |
| 2023/0175435 | A1 * | 6/2023 | Benjamin | B64D 37/30 |

FOREIGN PATENT DOCUMENTS

| | | | |
|---|---|---|---|
| JP | 2005180799 | A | 7/2005 |
| WO | 2025220633 | A1 | 10/2025 |

* cited by examiner

COMBUSTION SECTION FOR A TURBINE ENGINE

TECHNICAL FIELD

The present subject matter relates generally to a combustion section for a turbine engine.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
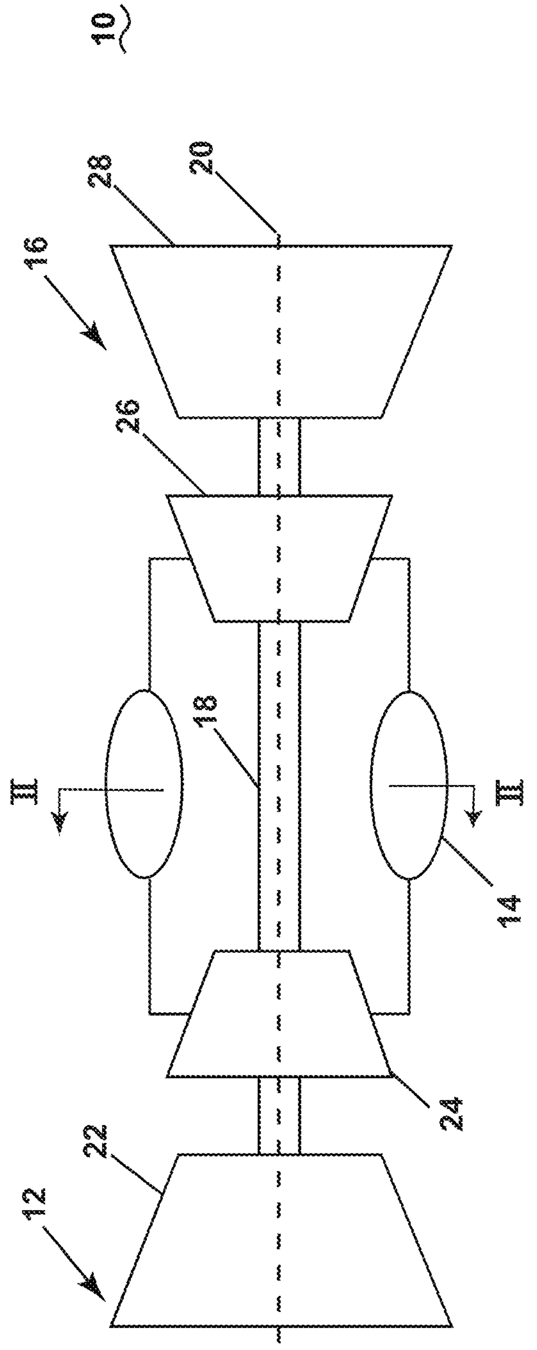
FIG. 1 is a schematic cross-sectional view of a turbine engine having a compressor section, a combustion section, and a turbine section in accordance with various aspects described herein.

Aspects of the disclosure described herein are directed to a combustion section for a turbine engine. The combustion section includes a set of fuel nozzles. Each fuel nozzle of the set of fuel nozzles includes a fuel nozzle body defining a central channel. A set of swirlers are provided within the central channel.

The set of swirlers are used to swirl a flow of fluid (e.g., a flow of compressed air, a flow of fuel, or a combination thereof). An amount of swirl to the flow of fluid that flows over or through each swirler of the set of swirlers is quantified by a swirl number. The swirl number is defined as an integral of the tangential momentum to the axial momentum of the flow of fluid downstream of a respective swirler of the set of swirlers. Each swirler of the set of swirlers swirls a respective portion of the flow of fluid such that the swirl number is greater than or equal to 0.1 and less than or equal to 1.2.

The set of fuel nozzles are especially well adapted for the use with a flow of hydrogen fuel (hereinafter, "H2 fuel"). Specifically, the set of fuel nozzles are especially well adapted to feed a flow of H2 fuel to the combustion chamber. The flow of H2 fuel includes at least one of a gaseous H2 fuel, a liquid H2 fuel, or a combination thereof. The flow of H2 fuel can further be mixed with other fuels or fluids such as, but not limited to, natural gas, coke oven gas, diesel, Jet-A, or the like. H2 fuels, when compared to traditional fuels (e.g., carbon fuels, petroleum fuels, etc.), have a lower carbon emissions. However, H2 fuels burn hotter than and are relatively more unstable when compared to traditional fuels. For example, H2 fuels have a higher burn rate and velocity than traditional fuels. As such, an improper mixture of H2 fuel and compressed air can result in flashback occurring or a flame generated through ignition of the H2 fuel spreading to unwanted regions of the turbine engine. The improper mixture of H2 fuel and compressed air, for example, creates pockets of H2 fuel that in some instances can ignite within the fuel nozzle (e.g., flashback). The fuel nozzle, as described herein, includes the set of swirlers specially suited for combustion sections utilizing H2 fuel.

For purposes of illustration, the present disclosure will be described with respect to a turbine engine. It will be understood, however, that aspects of the disclosure described herein are not so limited and that a combustion section as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

As used herein, the term "swirled" fluid flow or iterations thereof refers to an axisymmetric fluid flow having a circumferential rotation, or swirl, about a central axis. The amount of swirl that fluid flow has is quantified by a swirl number. The swirl number is defined as an integral of the tangential momentum to the axial momentum of the flow of fluid with respect to the central axis.

As used herein, the term "turbulent" fluid flow or iterations thereof refers to a non-laminar, chaotic and localized fluid flow. Turbulence, for example, can be in the form of a localized swirls, vortices or eddies. The turbulence of a turbulent fluid flow is quantified through use of turbulent kinetic energy and the Reynolds number of the fluid.

In relation to one another, the swirl of a fluid flow refers to a large-scale organized rotational movement of the fluid flow, while the turbulence of a fluid flow refers to a localized chaotic movement of the fluid flow. It will be appreciated that a fluid flow can include both swirl and turbulence.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first" and "second" may be used interchangeably to distinguish one component from another and are not intended to signify location or importance of the individual components.

The terms "forward" and "aft" refer to relative positions within a gas turbine engine or a vehicle, and refer to the normal operational attitude of the gas turbine engine or vehicle. For example, with regard to a gas turbine engine, forward refers to a position closer to an engine inlet and aft refers to a position closer to an engine exhaust. For example, in FIGS. 1, 3, 4, 12, 15, 17, 20, 21, 22 and 24 forward is generally illustrated to the left, and aft/rearward is generally illustrated to the right.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid, or a combination thereof. The term "fluidly coupled" means that a fluid is capable of making the connection between the areas specified. The term "fluidly exposed" means that one or more portions of an object is contacted by a fluid.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The term “nozzle” has been used in various ways in the context of gas turbine engines. In the instant application, “nozzle” refers to a component having a portion for fluid coupling to a fuel supply and having at least one portion for fluidly coupling with a combustion chamber.

All directional references (e.g., radial, axial, upper, lower, left, right, front, back, top, bottom, above, below, vertical, horizontal, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The singular forms “a”, “an”, and “the” include plural references unless the context clearly dictates otherwise. Furthermore, as used herein, the term “set” or a “set” of elements can be any number of elements, including only one.

Uses of “and” and “or” are to be construed broadly. For example, uses of “and” without limitation, do not necessarily require all elements or features listed, and uses of “or” are inclusive unless such a construction would be illogical.

FIG. 1 is a schematic view of a turbine engine 10. As a non-limiting example, the turbine engine 10 can be used within an aircraft. The turbine engine 10 includes, at least, a compression section 12, a combustion section 14, and a turbine section 16 in serial flow arrangement. A drive shaft 18 rotationally couples the compression section 12 and the turbine section 16, such that rotation of one affects the rotation of the other, and defines a rotational axis or engine centerline 20 for the turbine engine 10.

The compression section 12 can include a low-pressure (LP) compressor 22, and a high-pressure (HP) compressor 24 serially fluidly coupled to one another. The turbine section 16 can include an LP turbine 28, and an HP turbine 26 serially fluidly coupled to one another. The drive shaft 18 operatively couples the LP compressor 22, the HP compressor 24, the LP turbine 28 and the HP turbine 26 together. Alternatively, the drive shaft 18 can include an LP drive shaft (not illustrated) and an HP drive shaft (not illustrated). The LP drive shaft couples the LP compressor 22 to the LP turbine 28, and the HP drive shaft couples the HP compressor 24 to the HP turbine 26. An LP spool is defined as the combination of the LP compressor 22, the LP turbine 28, and the LP drive shaft such that the rotation of the LP turbine 28 applies a driving force to the LP drive shaft, which in turn rotates the LP compressor 22. An HP spool is defined as the combination of the HP compressor 24, the HP turbine 26, and the HP drive shaft such that the rotation of the HP turbine 26 applies a driving force to the HP drive shaft which in turn rotates the HP compressor 24.

The compression section 12 includes a plurality of axially spaced stages. Each stage includes a set of circumferentially spaced rotating blades and a set of circumferentially spaced stationary vanes. The compressor blades for a stage of the compression section 12 can be mounted to a disk, which is mounted to the drive shaft 18. Each set of blades for a given stage can have its own disk. The vanes of the compression section 12 can be mounted to a casing which can extend circumferentially about the turbine engine 10. It will be appreciated that the representation of the compression section 12 is merely schematic and that there can be any number of stages. Further, it is contemplated, that there can be any other number of components within the compression section 12.

Similar to the compression section 12, the turbine section 16 includes a plurality of axially spaced stages, with each stage having a set of circumferentially spaced, rotating blades and a set of circumferentially spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 is provided serially between the compression section 12 and the turbine section 16. The combustion section 14 is fluidly coupled to at least a portion of the compression section 12 and the turbine section 16 such that the combustion section 14 at least partially fluidly couples the compression section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compression section 12 via a fan (not illustrated) upstream of the compression section 12, where the air is compressed defining a compressed air. The compressed air then flows into the combustion section 14 where the compressed air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The compressed air flow and the combustion gases can together define a working air flow that flows through the fan, compression section 12, combustion section 14, and turbine section 16 of the turbine engine 10.

Figure 2:
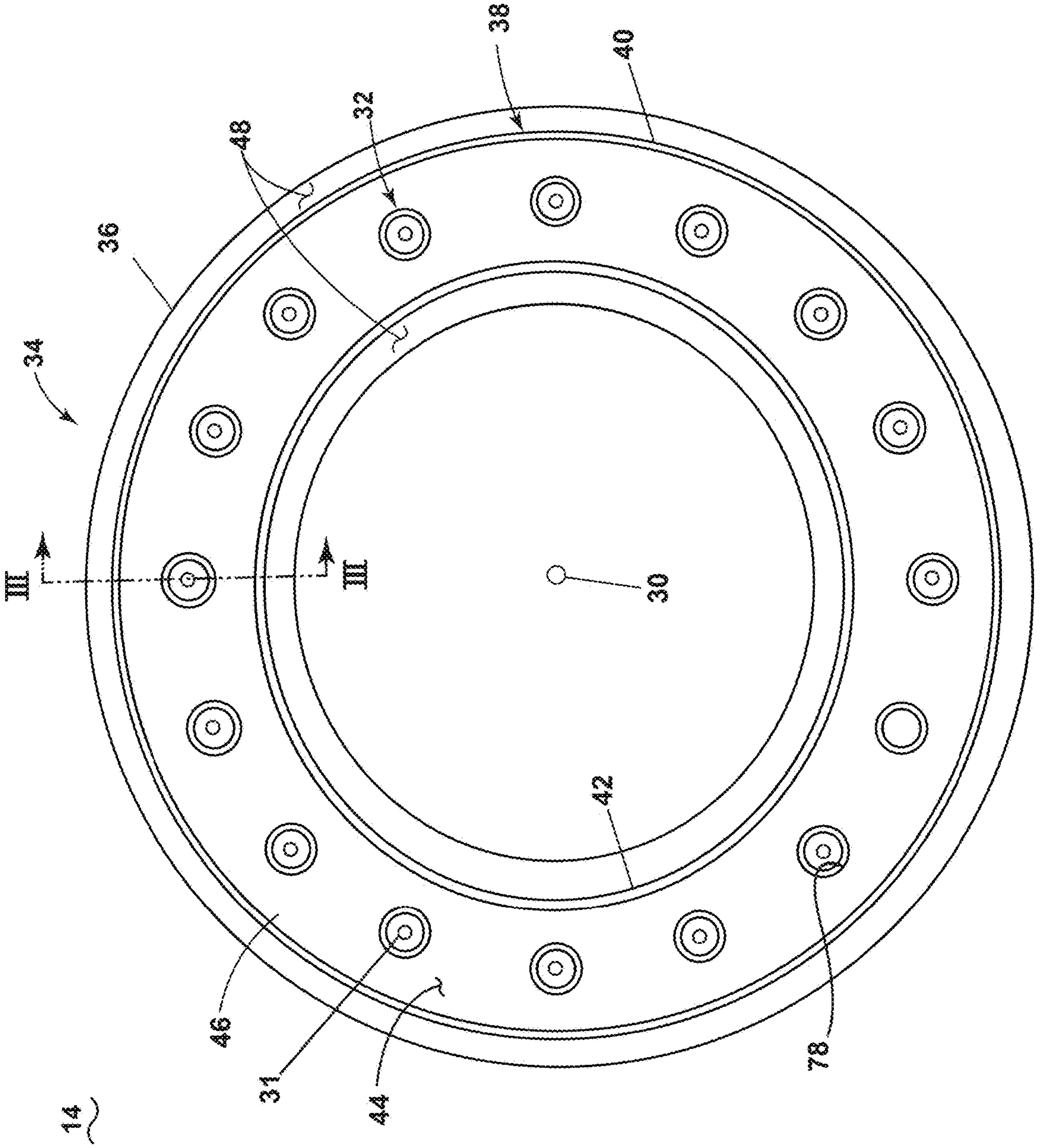
FIG. 2 is a schematic view of a combustor of the combustion section of FIG. 1 along line II-II in accordance with various aspects described herein.

FIG. 2 depicts a cross-sectional view of the combustion section 14 along line II-II of FIG. 1. For purposes of illustration, the drive shaft 18 (FIG. 1) has been removed. The combustion section 14 includes a combustor 34. The combustor 34 include a combustor centerline 30. The combustor centerline 30 can be aligned with or offset from the engine centerline 20 (FIG. 1).

The combustor 34 includes a dome wall 44, a casing 36, and a combustor liner 38. The dome wall 44 includes a set of fuel nozzle openings 78. The combustor liner 38 includes an inner combustor liner 42 and an outer combustor liner 40. The inner combustor liner 42 is radially inward from the outer combustor liner 40, with respect to the combustor centerline 30. The dome wall 44 together with the combustor liner 38 defines a combustion chamber 46. The combustion chamber 46 has an annular configuration with respect to the combustor centerline 30. A compressed air passageway 48 is defined at least in part by both the combustor liner 38 and the casing 36. The compressed air passageway 48 is at least partially defined by a radial gap between the casing 36 and the outer combustor liner 40. The dome wall 44 interconnects the inner combustor liner 42 and the outer combustor liner 40.

The combustion section 14 includes a set of fuel nozzles 32 extending through the set of fuel nozzle openings 78. The set of fuel nozzles 32 are annularly arranged about a combustor centerline 30. Each fuel nozzle of the set of fuel nozzles 32 includes a nozzle centerline 31. The set of fuel nozzles 32 can include rich cups, lean cups, or a combination of both rich and lean cups.

The combustor 34 can have a can, can-annular, or annular arrangement depending on the type of engine in which the combustor 34 is located. In a non-limiting example, the combustor 34 can have a combination arrangement as further described herein located within a casing 36 of the engine. The combustor liner 38, as illustrated by way of example, can be annular. Additionally, or alternatively, the combustor centerline 30 can be a centerline for the combustion section 14, a single combustor, or a set of combustors that are arranged about the combustor centerline 30.

Figure 3:
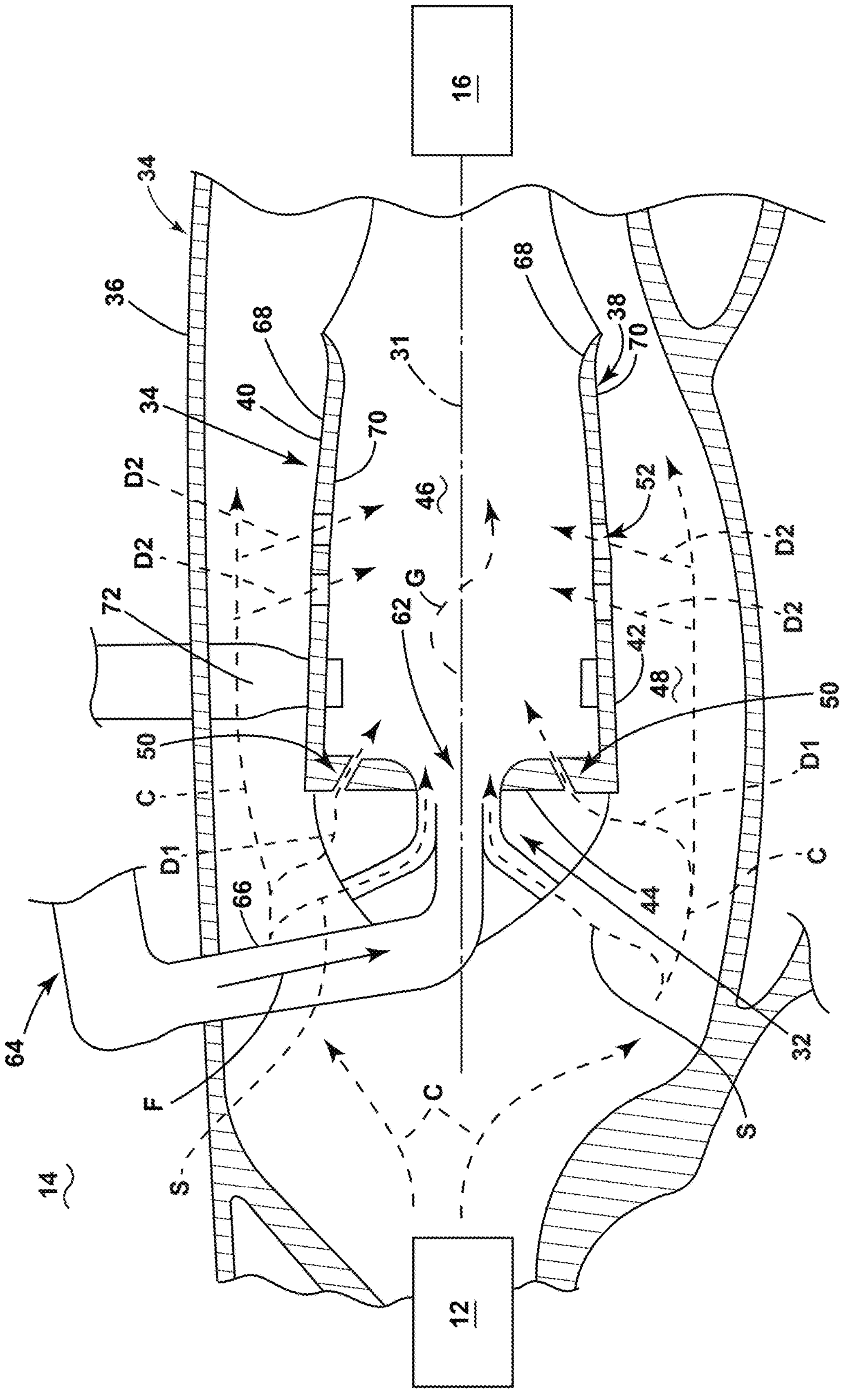
FIG. 3 is a schematic cross-sectional view illustrating portions of the combustor of FIG. 2 along line III-III in accordance with various aspects described herein.

FIG. 3 depicts a cross-section view taken along line III-III of FIG. 2 illustrating the combustion section 14. Each fuel nozzle of the set of fuel nozzles 32 can be coupled to and disposed within a wall of the combustion section 14. As a non-limiting example each fuel nozzle of the set of fuel nozzles 32 can be disposed within the dome wall 44 or the combustor liner 38. Each fuel nozzle of the set of fuel nozzles 32 is fluidly coupled to a fuel inlet 64 via a passageway 66.

Both the inner combustor liner 40 and the outer combustor liner 42 have an outer surface 70 and an inner surface 68. The inner surface 68 at least partially defining the combustion chamber 46. The combustor liner 38 can be made of one continuous monolithic portion or be multiple monolithic portions assembled together to define the inner combustor liner 40 and the outer combustor liner 42. By way of non-limiting example, the outer surface 68 can define a first piece of the combustor liner 38 while the inner surface 70 can define a second piece of the combustor liner 38 that when assembled together form the combustor liner 38. As described herein, the combustor liner 38 includes a second set of flame shaping holes 52. It is further contemplated that the combustor liner 38 can be any type of combustor liner 38, including but not limited to a single wall or a double walled liner or a tile liner. An ignitor 72 can be provided at the combustor liner 38 and fluidly coupled to the combustion chamber 46, at any location, by way of non-limiting example upstream of the second set of flame shaping holes 52.

At least one flame shaping passage can fluidly connect compressed air and the combustion chamber 46. By way of example, the at least one flame shaping passage is illustrated as a first set of flame shaping holes 50 or the second set of flame shaping holes 52. The combustor 34 can include the first set of flame shaping holes 50, the second set of flame shaping holes 52, or both the first set of flame shaping holes 50 and the second set of flame shaping holes 52.

The first set of flame shaping holes 50 pass through the dome wall 44, fluidly coupling compressed air (C) from the compression section 12 (FIG. 1) or the compressed air passageway 48 to the combustion chamber 46. The second set of flame shaping holes 52 pass through the combustor liner 38, fluidly coupling compressed air from the compressed air passageway 48 to the combustion chamber 46.

During operation, compressed air (C) from a compressed air supply, such as the LP compressor 22 or the HP compressor 24 of FIG. 1, can flow from the compression section 12 to the combustor 34. A first part of the compressed air (C) is fed to each fuel nozzle of the set of fuel nozzles 32 as a swirled airflow(S). As used herein, the swirled airflow(S) is a flow of fluid having a swirl number of grater than or equal to 0.1 and less than or equal to 1.2. A flow of fuel (F) is fed to each fuel nozzle of the set of fuel nozzles 32 via the fuel inlet 64 and the passageway 66. The swirled airflow(S) and the flow of fuel (F) are mixed upstream of a fuel nozzle outlet 62 and fed to the combustion chamber 46 as a fuel/air mixture. The ignitor 72 ignites the fuel/air mixture to define a flame within the combustion chamber 46, which generates a combustion gas (G). While shown as starting axially downstream of the fuel nozzle outlet 62, it will be appreciated that the fuel/air mixture can be ignited at or near the fuel nozzle outlet 62.

A second part of the compressed air (C) can be fed to the first set of flame shaping holes 50 as a first flame shaping airflow (D1). Another portion of the compressed air (C) can flow through the compressed air passageway 48 and can be fed to the second set of flame shaping holes 52 as a second flame shaping airflow (D2). The first flame shaping airflow (D1) can be used to direct and shape the flame (e.g., the combustion gases (G)) within the combustion chamber 46.

The combustor 34 shown in FIG. 3 is well suited for the use of a hydrogen-containing gas as the fuel because it helps contain the faster moving flame front associated with hydrogen fuel, as compared to traditional hydrocarbon fuels. However, the combustor 34 can be used with other fuels, such as gaseous and liquid hydrocarbon fuels.

Figure 4:
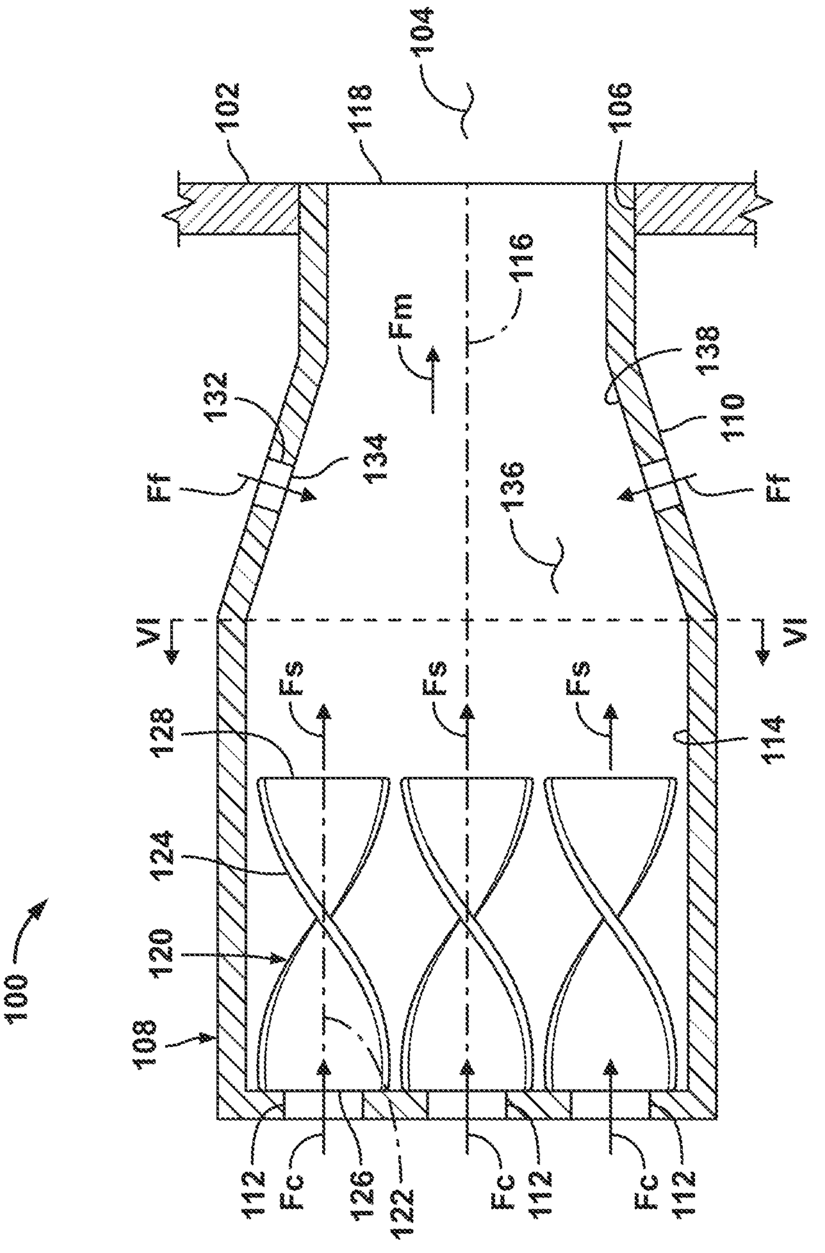
FIG. 4 is a schematic cross-sectional view of a combustion section suitable for use as the combustion section of FIG. 3, further comprising a fuel nozzle having a fuel nozzle body and a set of swirlers in accordance with various aspects described herein.

FIG. 4 is a schematic cross-sectional view of an exemplary combustion section 100 suitable for use as the combustion section 14 of FIG. 3. The combustion section 100 is similar to the combustion section 14; therefore, like parts will be identified with like names with it being understood that the description of the combustion section 14 applies to the combustion section 100 unless noted otherwise.

The combustion section 100 includes a wall 102. The wall 102 at least partially defines a combustion chamber 104. The wall 102 is any suitable wall of the combustion section 100 such as, but not limited to, a dome wall (e.g., the dome wall 44 of FIG. 2), a combustor liner (e.g., the combustor liner 38 of FIG. 2), or a combination thereof. The wall 102 includes a fuel nozzle opening 106.

The combustion section 100 includes a fuel nozzle 108. The fuel nozzle 108 opens to the combustion chamber 104 through the wall 102. As a non-limiting example, the fuel nozzle 108 is receivable within the fuel nozzle opening 106. The fuel nozzle 108 includes a fuel nozzle body 110. The fuel nozzle body 110 defines a central channel 114 and includes a nozzle centerline 116. A fuel nozzle inlet 112 extends through the fuel nozzle body 110 and opens to the central channel 114. The central channel 114 opens to the combustion chamber 104 at a fuel nozzle outlet 118.

The fuel nozzle 108 includes a set of fuel channels 132. The set of fuel channels 132 extends through a respective portion of the fuel nozzle body 110. The set of fuel channels 132 open to the central channel 114 at a set of fuel orifices 134. The set of fuel orifices 134 are formed as at least one of a plurality of holes, a plurality of slots, a plurality of channels, or a combination thereof that are circumferentially spaced along the fuel nozzle body 110, with respect to the nozzle centerline 116.

The fuel nozzle 108 includes a premixer 136. The premixer 136 is defined as a portion of the central channel 114 that the set of fuel orifices 134 open to. The premixer 136 coincides with any suitable portion of the fuel nozzle body 110. As a non-limiting example, the fuel nozzle body 110 can include a conic section 138 defined as a region of the fuel nozzle body 110 that converges radially inward towards the nozzle centerline 116. The set of fuel orifices 134 can open along the conic section 138 such that the premixer 136 is at least partially defined by the conic section 138.

The fuel nozzle 108 includes a set of swirlers 120. It will be appreciated that the set of swirlers 120 can include any number of one or more swirlers. As a non-limiting example, the set of swirlers 120 can include a singular swirler. Each swirler of the set of swirlers 120 includes a body centerline 122 and a set of helical vanes 124. Each helical vane of the set of helical vanes 124 extends radially from the body centerline 122. Each helical vane of the set of helical vanes 124 extends axially between a first end 126 and a second end 128 along the body centerline 122. As used herein, a helical vane is a wall extending circumferentially about a respective body centerline 122 in a helical fashion a total distance, in radians, of greater than or equal to $\pi/2$ radians. Put another way, each helical vane of the set of helical vanes 124 includes a second end 128 that is greater than or equal to $\pi/2$ radians circumferentially from the first end 126.

Each swirler of the set of swirlers 120 can include at least one helical vane of the set of helical vanes 124. As a non-limiting example, each set of helical vanes 124 includes greater than or equal to one and less than or equal to eight helical vanes circumferentially arranged about the body centerline 122. As illustrated, each swirler of the set of swirlers 120 includes two helical vales of the set of helical vanes 124. As illustrated, the first end 126 and the second end 128 of each helical vane of the set of helical vanes 124 axially corresponds to one another, with respect to the body centerline 122; though that does not need be the case as described herein.

The set of helical vanes 124 are integrally formed with respect to each other or otherwise coupled to one another. As a non-limiting example, the set of helical vanes 124 can be formed as separate pieces and coupled to one another through any suitable coupling method such as, but not limited to, welding, adhesion, bonding, fastening, threading, or the like. The set of swirlers 120 are integrally formed with or coupled to the fuel nozzle body 110. As a non-limiting example, the set of swirlers 120 can be separately manufactured from and subsequently coupled to a respective portion of the fuel nozzle body 110 through any suitable coupling method such as, but not limited to, welding, adhesion, bonding, fastening, threading, or the like. The set of swirlers 120 are aligned with the fuel nozzle inlet 112.

The fuel nozzle 108 can be symmetric about the nozzle centerline 116. The fuel nozzle 108 can be asymmetric about the nozzle centerline 116. The fuel nozzle body 110 can be symmetric about the nozzle centerline 116. The fuel nozzle body 110 can be asymmetric about the nozzle centerline 116. The combustion section 100 includes a set of fuel nozzles having any number of one or more fuel nozzles. The set of fuel nozzles can all be formed as the fuel nozzle 108 and include a respective set of swirlers 120. Alternatively, at least one fuel nozzle of the set of fuel nozzles can be formed without a respective set of swirlers 120.

During operation of the combustion section 100, a flow of compressed air (Fc) is fed to the central channel 114 through the fuel nozzle inlet 112. The flow of compressed air (Fc), like the compressed air (C) of FIG. 3) is from any suitable portion of the turbine engine (e.g., the turbine engine 10 of FIG. 1) such as, but not limited to, a compressor section (e.g., the compressor section 12 of FIG. 1). As the fuel nozzle inlet 112 is aligned with the set of swirlers 120, the flow of compressed air (Fc) flows over the set of swirlers 120. Specifically, the flow of compressed air (Fc) flows over and follows the contour of the set of helical vanes 124. Put another way, the set of helical vanes 124 direct the flow of compressed air (Fc) to form the flow of swirled air (Fs). The set of swirlers 120 swirl the flow of compressed air (Fc) to define a flow of swirled air (Fs). The flow of swirled air (Fs) has a swirl number of greater than or equal to 0.1 and less than or equal to 1.2.

A flow of fuel (Ff) is fed through the set of fuel channels 132 and into the premixer 136. The flow of fuel (Ff) is mixed with the flow of swirled air (Fs) to define a mixed flow of fuel and air (Fm). The mixed flow of fuel and air (Fm) is fed to the combustion chamber 104. The mixed flow of fuel and air (Fm) is ignited (e.g., via the ignitor 72 of FIG. 3) to generate a flame (not illustrated) and combustion gases (e.g., the combustion gases (G) of FIG. 3).

The flow of fuel (Ff) injected into and mixed within the flow of swirled air (Fs). The flow of fuel (Ff) is mixed within the flow of swirled air (Fs) to generate the mixed flow of fuel and air (Fm) with a homogenous or near-homogenous mixture of fuel and air. As used herein, a homogenous mixture of fuel and air refers to a flow of fluid containing a fuel and air in which the fuel is evenly or nearly-homogenous spread throughout the flow of air. "Nearly-homogenous", or iterations thereof, refers to instances where small sections of the homogenous mixture of fuel and air includes larger concentrations of fuel or air. It will be appreciated that these small sections are negligible and defined as regions where, once the mixed flow of fuel and air (Fm) is ignited, will not cause flashback to occur or for a noticeable difference in temperature distribution to occur. The mixed flow of fuel and air (Fm), due to the flow of swirled air (Fs) does not include large pockets or concentrations of fuel. The large pockets or concentrations of fuel are defined as areas within a mixture of fuel and air that would cause flashback or a noticeable non-uniform temperature distribution once the mixed flow of fuel and air (Fm) is ignited.

The flow of fuel (Ff) contains any suitable fuel. As a non-limiting example, the flow of fuel (Ff) includes a flow of H2 fuel (e.g., 100% gaseous H2 fuel, 100% liquid H2 fuel, or H2 fuel mixed with another fuel or fluid).

The fuel nozzle 108 is especially well suited for use where the flow of fuel (Ff) contains a flow of H2 fuel. As discussed herein, the flow of swirled air (Fs) ensures a homogenous mixture of fuel and air, thus reducing the likelihood of large pockets or concentrations of fuel to be formed within the mixed flow of fuel and air (Fm). As discussed herein, H2 fuels have a higher burn velocity and greater chance for flashback. The elimination of or reduction of the large concentrations of fuel within the mixed flow of fuel and air (Fm) reduces the likelihood of flashback occurring by reducing the locations where the flame can spread.

Further, the use of the flow of swirled air (Fs) allows for a lean-fuel mixture of the mixed flow of fuel and air (Fm). Put another way, the flow of swirled air (Fs) ensures that the flow of fuel (Ff) and the flow of swirled air (Fs) are uniformly or nearly uniformly mixed. This, in turn, ensures that the mixed flow of fuel and air (Fm) can be fully ignited as each portion of the mixed flow of fuel and air (Fm) contains equal parts or nearly equal parts of fuel. The full ignition of the mixed flow of fuel and air (Fm) further creates a uniform temperature distribution along the flame generated by the ignition of the mixed flow of fuel and air (Fm). The generation of the uniform temperature distribution along with the use of a lean mixture of fuel and air (e.g., less fuel), in turn, results in a combustion section 100 that utilizes a lower amount of fuel and further generates a lesser volume of emissions (e.g., NOx emissions).

As illustrated, the set of fuel channels 132 are oriented such that the set of fuel orifices 134 are pointed radially inward towards the nozzle centerline 116. Further, the set of fuel channels 132 are oriented such that the set of fuel orifices 134 are pointed axially towards the set of swirlers 120 with respect to the nozzle centerline 116. This orientation, in turn, ensures that the flow of fuel (Ff) is directed into the flow of swirled air (Fs), thus ensuring that the flow of fuel (Ff) is adequately mixed with the flow of swirled air (Fs) to form the homogenous mixture of fuel and air.

Figure 5:
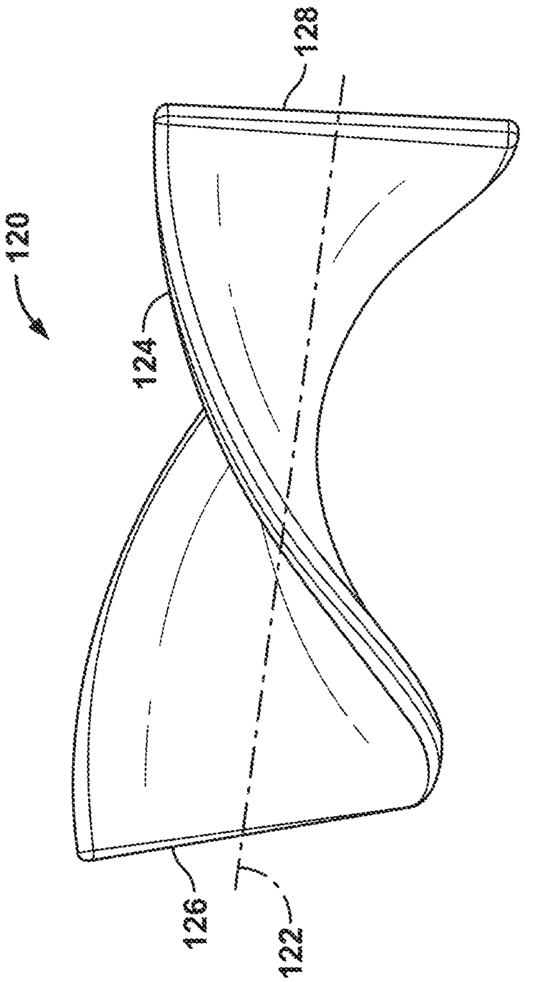
FIG. 5 is a schematic perspective view of a swirler of the set of swirlers of FIG. 4, further illustrating a set of helical vanes of the swirler in accordance with various aspects described herein.

FIG. 5 is a schematic perspective view of a swirler 120 of the set of swirlers 120 of FIG. 4. The helical fashion of the helical vane of the set of helical vanes 124 is defined by the circumferential offset of the first end 126 with respect to the second end 128. As a non-limiting example, each second end 128 is spaced from the first end 126 at least $\pi/2$ radians about the body centerline 122. As illustrated, each second end 128 is spaced $\pi$ radians from the first end 126. As a non-limiting example, each second end 128 is greater than or equal to $\pi/2$ radians and less than or equal to $8\pi$ radians from the first end 126. Put another way, each helical vane of the set of helical vanes 124 wraps about the body centerline 122 greater than or equal to $\pi/2$ radians and less than or equal to $8\pi$ radians from the first end 126 to the second end 128.

The set of helical vanes 124 wrap around the body centerline 122 to form a helix. As illustrated, the set of helical vanes 124 includes two helical vanes. The two helical vanes of the set of helical vanes 124 collectively form a double helix.

Figure 6:
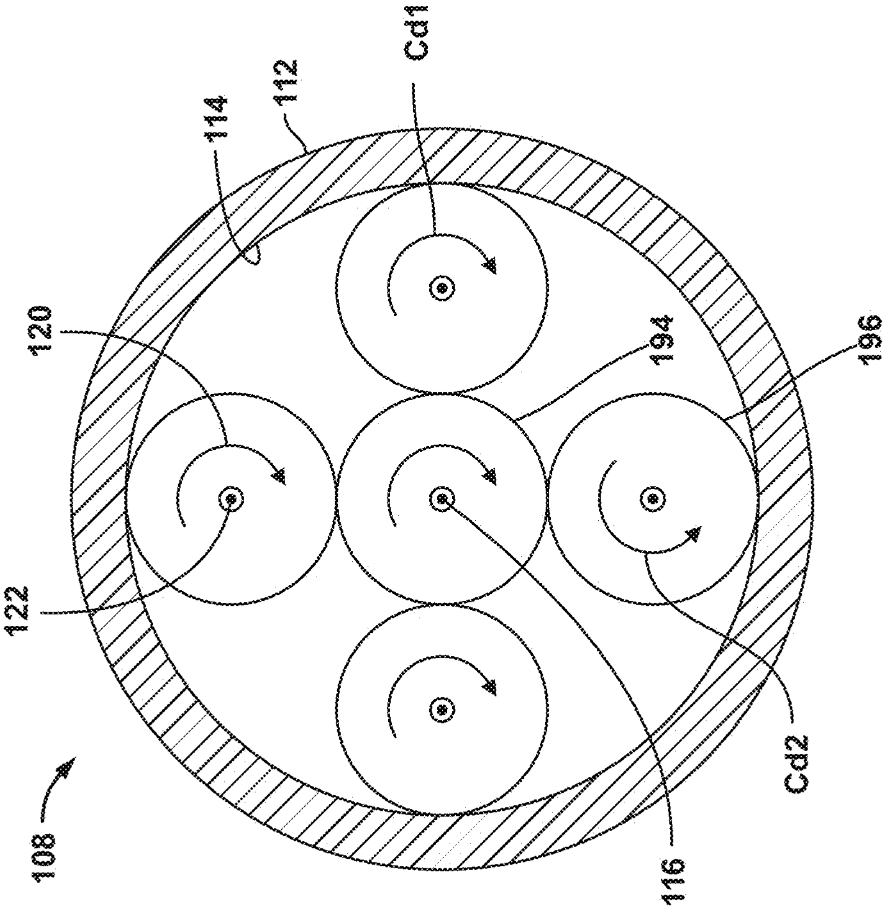
FIG. 6 is a schematic cross-sectional view of the fuel nozzle as seen from sectional line VI-VI of FIG. 4, further illustrating a circumferential arrangement of the set of swirlers in accordance with various aspects described herein.

FIG. 6 is a schematic cross-sectional view of the fuel nozzle 108 as seen from sectional line VI-VI of FIG. 4. The set of swirlers 120 includes any number of one or more swirlers. As a non-limiting example, the set of swirlers 120 can include a set of swirlers including, for example, five swirlers.

The set of swirlers 120 are arranged in any suitable arrangement with respect to the nozzle centerline 116. As a non-limiting example, the set of swirlers 120 can include a central swirler 194 and a set of peripheral swirlers 196. The central swirler 194 is defined as a swirler of the set of swirlers that includes a body centerline 122 nearest the nozzle centerline 116. As a non-limiting example, the body centerline 122 of the central swirler 194 can extend along the nozzle centerline 116, as illustrated. The set of peripheral swirlers 196 are circumferentially arranged about the central swirler 194.

During operation, the set of swirlers 120 swirl the flow of compressed air (Fc) of FIG. 4 to generate the flow of swirled air (Fs) of FIG. 4. It is contemplated that each swirler of the set of swirlers 120 is oriented to cause the flow of swirled air (Fs) to flow with a circumferential or tangential component. Specifically, the direction that the set of helical vanes 124 (FIG. 4) extend sets the direction that the circumferential component of the flow of swirled air (Fs) flowing off each swirler of the set of swirlers 120 flows. Put another way, the orientation is set by the direction that each helical vane of the set of helical vanes 124 per swirler of the set of swirlers 120 wraps around the respective body centerline 122.

As a non-limiting example, a first portion of the set of swirlers 120 can swirl a respective portion of the flow of compressed air (Fc) in a first circumferential direction (Cd1) with respect to the respective body centerline 122. A second portion of the set of swirlers 120 can swirl a respective portion of the flow of compressed air (Fc) in a second circumferential direction (Cd2) with respect to the respective body centerline 122. Alternatively, each swirler of the set of swirlers 120 can swirl the flow of compressed air (Fc) in one of the first circumferential direction (Cd1) or the second circumferential direction (Cd2).

The variation of the directionality of the circumferential direction of the flow of compressed air (Fc), the variation of the arrangement of the set of swirlers 120 with respect to the nozzle centerline 116, or a combination thereof is used to create turbulence (e.g., a turbulent fluid flow) within the central channel 114. As discussed herein, the use of turbulence helps with ensuring that the mixed flow of fuel and air (Fm) of FIG. 4 is a homogenous mixture of fuel and air.

Figure 7:
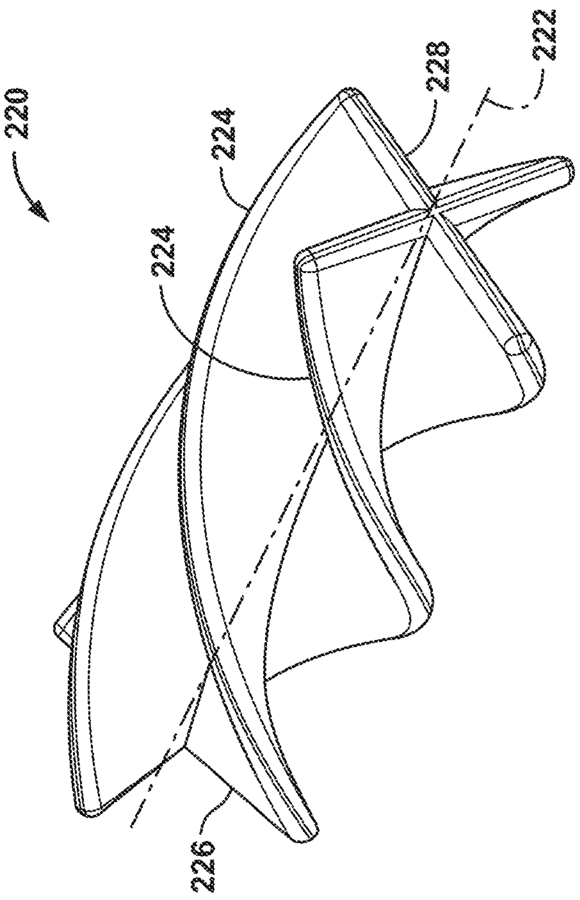
FIG. 7 is a schematic perspective view of an exemplary swirler suitable for use within the set of swirlers of FIG. 4, further illustrating a set of helical vanes including four helical vanes in accordance with various aspects described herein.

FIG. 7 is a schematic perspective view of an exemplary swirler 220 suitable for use within the set of swirlers 120 of FIG. 4. The swirler 220 is similar to the set of swirlers 120; therefore, like parts will be identified with like numerals increased to the 200 series with it being understood that the description of the set of swirlers 120 applies to the swirler 220 unless noted otherwise.

The swirler 220 includes a body centerline 222. The swirler 220 includes a set of helical vanes 224 extending radially from the body centerline 222. Each helical vane of the set of helical vanes 224 extends axially between a first end 226 and a second end 228, with respect to the body centerline 222. The set of helical vanes 224 wrap around the body centerline 222 to form a helix.

The swirler 220 is similar to the set of swirlers 120 (FIG. 4), in that the swirler 220 includes the set of helical vanes 224. The set of helical vanes 224, however, include a total of four helical vanes that collectively form a quadruple helix or otherwise as two intersecting helical vanes.

Figure 8:
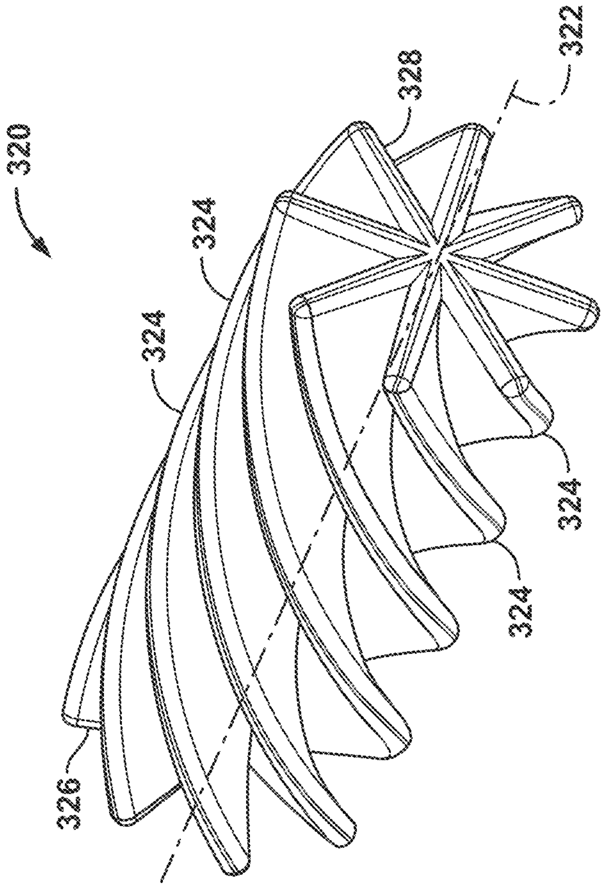
FIG. 8 is a schematic perspective view of an exemplary swirler suitable for use within the set of swirlers of FIG. 4, further illustrating a set of helical vanes including eight helical vanes in accordance with various aspects described herein.

FIG. 8 is a schematic perspective view of an exemplary swirler 320 suitable for use within the set of swirlers 120 of FIG. 4. The swirler 320 is similar to the set of swirlers 120 and the swirler 220 (FIG. 7); therefore, like parts will be identified with like numerals increased to the 300 series with it being understood that the description of the set of swirlers 120 and the swirler 220 applies to the swirler 320 unless noted otherwise.

The swirler 320 includes a body centerline 322. The swirler 320 includes a set of helical vanes 324 extending radially from the body centerline 322. Each helical vane of the set of helical vanes 324 extends axially between a first end 326 and a second end 328, with respect to the body centerline 322. The set of helical vanes 324 wrap around the body centerline 322 to form a helix.

The swirler 320 is similar to the set of swirlers 120 (FIG. 4) and the swirler 220 (FIG. 7), in that the swirler 320 includes the set of helical vanes 324. The set of helical vanes 324, however, include a total of eight helical vanes that collectively form an octo-helix or otherwise four intersecting helical vanes.

With reference to FIGS. 4-8, a variation in the number of helical vanes of the set of helical vanes 124, 224, 324 is used to vary the amount of swirl (e.g., the swirl number) that the respective swirler 120, 220, 320 generates. Specifically, the larger the number of helical vanes of the set of helical vanes 124, 224, 324, the larger the swirl number. Further, the larger the number of helical vanes of the set of helical vanes 124, 224, 324, the larger the turbulence and therefore the mixing capabilities of the set of helical vanes 124, 224, 324.

Figure 9:
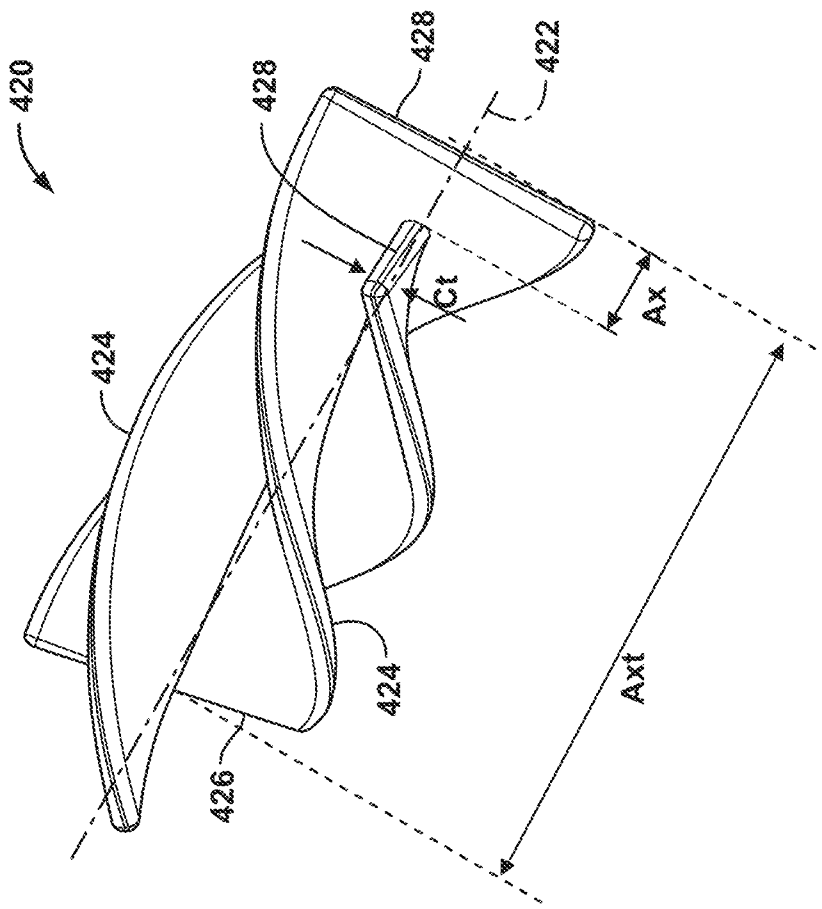
FIG. 9 is a schematic perspective view of an exemplary swirler suitable for use within the set of swirlers of FIG. 4, further illustrating a set of helical vanes, with at least two helical vanes of the set of helical vanes being axially offset in accordance with various aspects described herein.

FIG. 9 is a schematic perspective view of an exemplary swirler 420 suitable for use within the set of swirlers 120 of FIG. 4. The swirler 420 is similar to the set of swirlers 120 and the swirler 220 (FIG. 7), 320 (FIG. 8); therefore, like parts will be identified with like numerals increased to the 400 series with it being understood that the description of the set of swirlers 120 and the swirler 220, 320 applies to the swirler 420 unless noted otherwise.

The swirler 420 includes a body centerline 422. The swirler 420 includes a set of helical vanes 424 extending radially from the body centerline 422. Each helical vane of the set of helical vanes 424 extends axially between a first end 426 and a second end 428, with respect to the body centerline 422. The set of helical vanes 424 wrap around the body centerline 422 to form a helix. The set of helical vanes 424 can include any number of two or more helical vanes 424.

The swirler 420 is similar to the set of swirlers 120 (FIG. 4) and the swirler 220 (FIG. 7), 320 (FIG. 8), in that the swirler 420 includes the set of helical vanes 424. At least two helical vanes of the set of helical vanes 424, however, are axially offset. Specifically, one of the first end 426 or the second end 428 of a first helical vane is axially offset an axial distance (Ax) with respect to the first end 426 or the second end 428, respectively, of a second helical vane of the set of helical vanes 424. The axial distance (Ax) is any suitable size. As a non-limiting example, the swirler 420 extends a total axial distance (Axt) along the body centerline 422. The axial distance (Ax) is greater than 0% and less than or equal to 50% of the total axial distance (Axt).

Each helical vane of the set of helical vanes 424 is defined by a circumferential thickness (Ct) at the second end 428. The axial distance (Ax) is greater than 0 times and less than or equal to 20 times the circumferential thickness (Ct).

Figure 10:
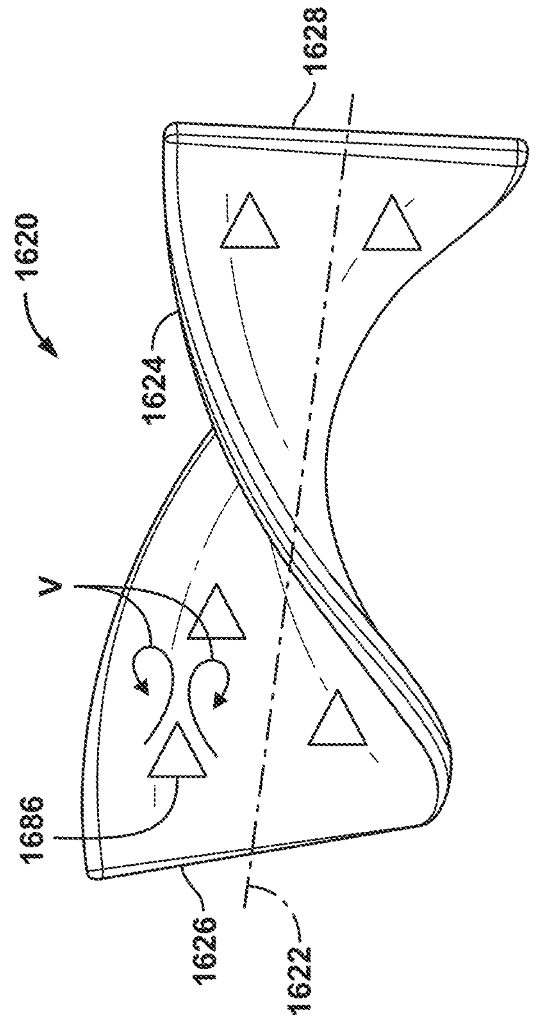
FIG. 10 is a schematic perspective view of an exemplary swirler suitable for use within the set of swirlers of FIG. 4, further illustrating a set of vortex generators provided along the swirler in accordance with various aspects described herein.

FIG. 10 is a schematic perspective view of an exemplary swirler 1620 suitable for use within the set of swirlers 120 of FIG. 4. The swirler 1620 is similar to the set of swirlers 120 and the swirler 220 (FIG. 7), 320 (FIG. 8), 420 (FIG. 9); therefore, like parts will be identified with like numerals increased to the 1600 series with it being understood that the description of the set of swirlers 120 and the swirler 220, 320, 420 applies to the swirler 1620 unless noted otherwise.

The swirler 1620 includes a body centerline 1622. The swirler 1620 includes a set of helical vanes 1624 extending radially from the body centerline 1622. Each helical vane of the set of helical vanes 1624 extends axially between a first end 1626 and a second end 1628, with respect to the body centerline 1622. The set of helical vanes 1624 wrap around the body centerline 1622 to form a helix.

The swirler 1620 is similar to the set of swirlers 120 (FIG. 4) and the swirler 220 (FIG. 7), 320 (FIG. 8), 420 (FIG. 9) in that the swirler 1620 includes the set of helical vanes 1624. The swirler 1620, however, includes a set of vortex generators 1686 provided along the set of helical vanes 1624. Each respective vortex generator of the set of vortex generators 1686 are defined as body or feature provided along the set of helical vanes 1624 that is configured to produce a vortex (V) when a flow of fluid (e.g., the flow of compressed air (Fc) or FIG. 4) flows over the respective vortex generator. The set of vortex generators 1686 include any number of one or more vortex generators circumferentially spaced along the set of helical vanes 1624, with respect to the body centerline 1622. Each vortex generator of the set of vortex generators 1686 is integrally formed with or coupled to (e.g., through welding, adhesion, bonding, fastening, or the like) a respective portion of the set of helical vanes 1624.

Each vortex generator of the set of vortex generators 1686 is any suitable vortex generator. As a non-limiting example, the set of vortex generators 1686 are at least one of a delta wing vortex generator, a counter-rotating vortex generator, a double-sided wedge, a wheeler vortex generator, a wing vortex generator, a winglet vortex generator, a Kuethe vortex generator, a wishbone vortex generator, a hairpin vortex generator, a lobed vortex generator, a wave-type vortex generator, or any combination thereof.

The set of helical vanes 1624 can include any number of two or more helical vanes 1624. The swirler 1620 can include any feature of component of any swirler described herein such as, but not limited to, the swirler 120 of FIG. 1, the swirler 220 of FIG. 7, the swirler 320 of FIG. 8, the swirler 420 of FIG. 9, or a combination thereof.

As discussed herein, each vortex generator of the set of vortex generators 1686 creates at least one vortex (V) downstream of the respective vortex generator. For the purpose of illustration, the vortex or vortices of a single vortex generator of the set of vortex generators 1686 are illustrated. As illustrated, the single vortex generator of the set of vortex generators 1686 creates two vortices (V). The number of vortices (V) created by the respective vortex generator of the set of vortex generators 1686 is determined by the formation of the vortex generator. As a non-limiting example, the vortex generator being formed as a delta wing vortex generator will produce two vortices on opposing sides of the vortex generator. As a non-limiting example, the vortex generator being formed as a half-delta wing vortex generator will produce a single vortex. A vortex generator that produces a single vortex is referred to as a singlet vortex generator, while a vortex generator that produces two vortices is referred to as a doublet vortex generator.

The use of the set of vortex generators 1686 increases the turbulence of the flow of compressed air (e.g., the flow of compressed air (Fc) of FIG. 4) as it flows over the swirler 1620. The increased turbulence, as discussed herein, helps create a homogenous mixture of fuel and air (e.g., the mixed flow of fuel and air (Fm) of FIG. 4).

Figure 11:
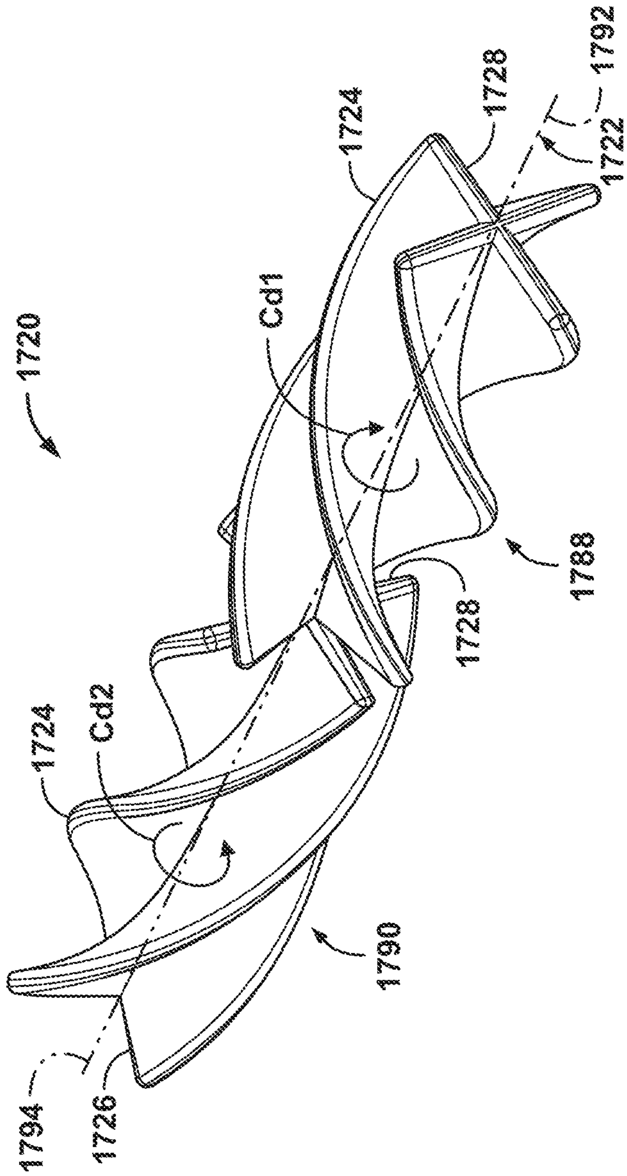
FIG. 11 is a schematic perspective view of an exemplary swirler suitable for use within the set of swirlers of FIG. 4, further illustrating a first swirler aligned with a second swirler in accordance with various aspects described herein.

FIG. 11 is a schematic perspective view of an exemplary swirler 1720 suitable for use within the set of swirlers 120 of FIG. 4. The swirler 1720 is similar to the set of swirlers 120 and the swirler 220 (FIG. 7), 320 (FIG. 8), 420 (FIG. 9), 1620 (FIG. 10); therefore, like parts will be identified with like numerals increased to the 1700 series with it being understood that the description of the set of swirlers 120 and the swirler 220, 320, 420, 1620 applies to the swirler 1720 unless noted otherwise.

The swirler 1720 includes a body centerline 1722. The swirler 1720 includes a set of helical vanes 1724. Each helical vane of the set of helical vanes 1724 extends between a first end 1726 and a second end 1728. The set of helical vanes 1724 wrap along the swirler 1720 to form a helix.

The swirler 1720 is similar to the set of swirlers 120 (FIG. 4) and the swirler 220 (FIG. 7), 320 (FIG. 8), 420 (FIG. 9), 1620 (FIG. 10), in that the swirler 1720 includes the set of helical vanes 1724. The swirler 1720, however, includes a first swirler 1788 and a second swirler 1790. The first swirler 1788 is provided downstream of the second swirler 1790 and touches a respective portion of the second swirler 1790.

The first swirler 1788 includes a first body centerline 1792. The second swirler 1790 includes a second body centerline 1794. The first body centerline 1792 and the second body centerline 1794 are similar to the body centerline 122 (FIG. 4), 222 (FIG. 7), 322 (FIG. 8), 422 (FIG. 9), 1622 (FIG. 10).

The first body centerline 1792 can be parallel to the second body centerline 1794. Alternatively, the first body centerline 1792 can be non-parallel to the second body centerline 1794. The first body centerline 1792 can coincide with the second body centerline 1794. Alternatively, the first body centerline 1792 can be offset from the second body centerline 1794.

The set of helical vanes 1724 of the first swirler 1788 extends radially from and wraps about the first body centerline 1792. The set of helical vanes 1724 of the second swirler 1790 extends radially from and wraps about the second body centerline 1794. The set of helical vanes 1724 of the first swirler 1788 wrap about the first body centerline 1792 in a first circumferential direction (Cd1). The set of helical vanes 1724 of the second swirler 1790 wrap about the second body centerline 1794 in a second circumferential direction (Cd2). The first circumferential direction (Cd1) is opposite the second circumferential direction (Cd2).

The set of helical vanes 1724 can include any number of two or more helical vanes 1724. The swirler 1720 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1620 of FIG. 10, or a combination thereof.

During operation, the first swirler 1788 will swirl a flow of compressed air (e.g., the flow of compressed air (Fc) of FIG. 4) in the first circumferential direction (Cd1). The second swirler 1790 will swirl the flow of compressed air in the second circumferential direction (Cd2). Directing the flow of compressed air first in one of the first circumferential direction (Cd1) or the second circumferential direction (Cd2), and subsequently in an other of the second circumferential direction (Cd2) or the first circumferential direction (Cd1) increases the turbulence of the flow of swirled air (e.g., the flow of swirled air (Fs) of FIG. 4) flowing downstream of the swirler 1720. As discussed herein, the increase in the turbulence, in turn, helps ensure the creation of a homogenous mixture of fuel and air in the mixed flow of fuel and air (e.g., the mixed flow of fuel and air of FIG. 4).

Figure 12:
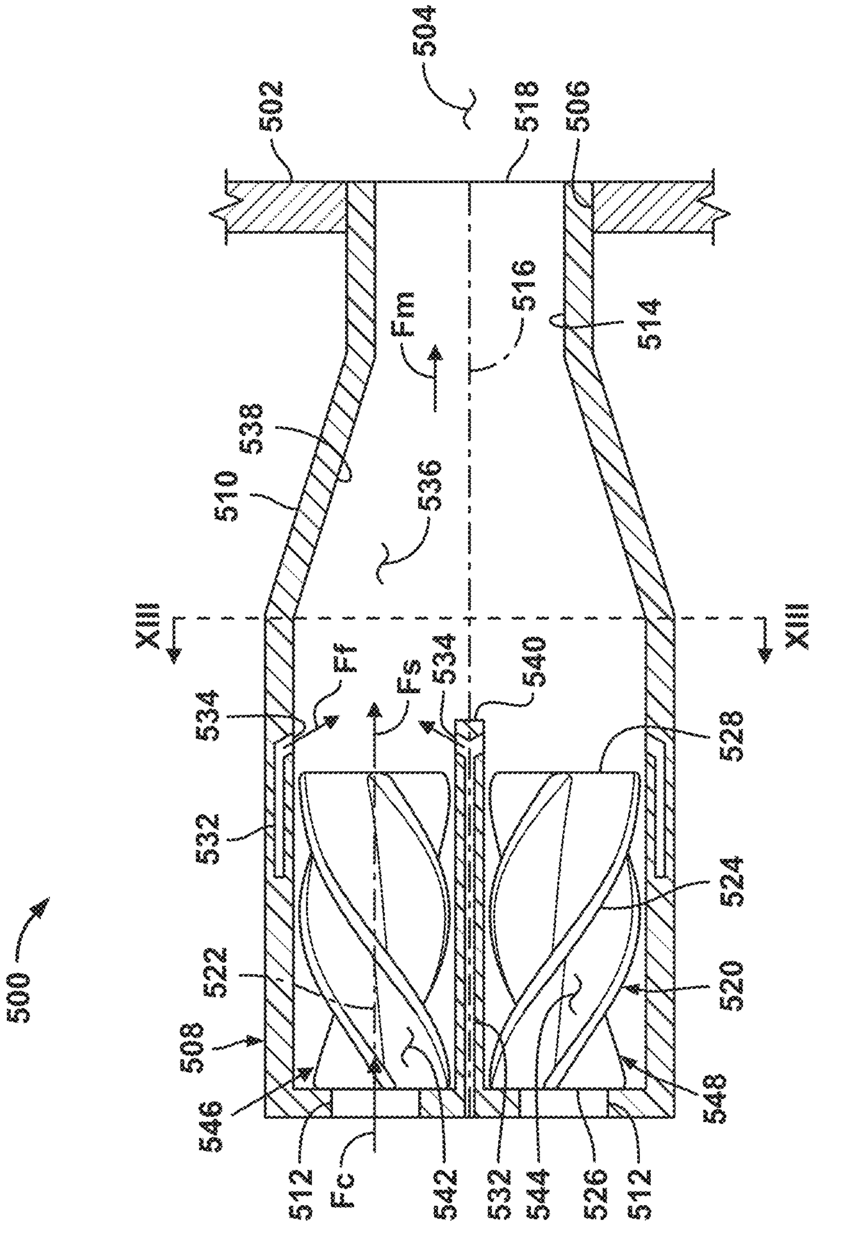
FIG. 12 is a schematic cross-sectional view of an exemplary combustion section suitable for use as the combustion section of FIG. 3, further comprising a fuel nozzle having a fuel nozzle body, a first swirler channel, a second swirler channel and set of swirlers in accordance with various aspects described herein.

FIG. 12 is a schematic cross-sectional view of an exemplary combustion section 500 suitable for use as the combustion section 14 of FIG. 3. The combustion section 500 is similar to the combustion section 100 (FIG. 4); therefore, like parts will be identified with like numerals increased to the 500 series with it being understood that the description of the combustion section 100 applies to the combustion section 500 unless noted otherwise.

The combustion section 500 includes a wall 502. The wall 502 at least partially defines a combustion chamber 504. The wall 502 includes a fuel nozzle opening 506. The combustion section 500 includes a fuel nozzle 508. The fuel nozzle 508 has a fuel nozzle body 510. The fuel nozzle 508 includes a fuel nozzle inlet 512 and a fuel nozzle outlet 518. A central channel 514 extends between the fuel nozzle inlet 512 and the fuel nozzle outlet 518. The fuel nozzle body 510 includes a nozzle centerline 516. The fuel nozzle body 510 includes a conic section 538 and a premixer 536.

The fuel nozzle 508 includes a set of swirlers 520. The set of swirlers 520 include any number of one or more swirlers. Each swirler of the set of swirlers 520 includes a body centerline 522. Each swirler of the set of swirlers 520 includes a set of helical vanes 524. The set of helical vanes 524 extends radially from and wraps around the body centerline 522. Each helical vane of the set of helical vanes 524 extends axially between a first end 526 and a second end 528. The set of helical vanes 524 can include any number of two or more helical vanes 124. Each swirler of the set of swirlers 520 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1620 of FIG. 10, the swirler 1720 of FIG. 11 or a combination thereof. It will be appreciated that the formation of the swirlers of the set of swirlers 520 can vary or be the same between the set of swirlers 520.

The fuel nozzle 508 is similar to the fuel nozzle 108 (FIG. 4) in that the fuel nozzle 508 includes a set of fuel channels 532 opening to the central channel 514 at a set of fuel orifices 534. At least a portion of the fuel channels of the set of fuel channels 532 extend through a respective portion of the fuel nozzle body 510 and include respective fuel orifices of the set of fuel orifices 534 opening along a respective portion of the fuel nozzle body 510. The fuel nozzle 508, however, further comprises an interior wall 540 extending from a respective portion of the fuel nozzle body 510 and through a respective portion of the central channel 514. At least a portion of the fuel channels of the set of fuel channels 532 extend through the interior wall 540. The set of fuel orifices 534 open along the interior wall 540.

The interior wall 540 splits a respective portion of the central channel 514 into at least two sections; a first swirler channel 542 and a second swirler channel 544. The set of swirlers 520 are split based on whether they are provided within the first swirler channel 542 or the second swirler channel 544. The set of swirlers 520 includes a first set of swirlers 546 located within the first swirler channel 542 and a second set of swirlers 548 located within the second swirler channel 544.

The set of fuel channels 532 and the set of fuel orifices 534 are arranged to open into respective portions of the first swirler channel 542 and the second swirler channel 544. As a non-limiting example, at least a portion of the set of fuel orifices 534 open into a region of the first swirler channel 542 or the second swirler channel 544 that is directly downstream of the first set of swirlers 546 and the second set of swirlers 548, respectively. Alternatively, at least a portion of the set of fuel orifices 534 can open to the central channel 514 axially between the first end 526 and the second end 528 of a respective helical vane of the set of helical vanes 524.

At least a portion of the set of fuel orifices 534 are oriented such that at least a portion of the set of fuel channels 532 extends radially inward towards a respective first swirler channel 542 or second swirler channel 544 with respect to the nozzle centerline 516 or a respective swirler of the set of swirlers 520. It will be appreciated that each swirler of the set of swirlers 520 can be aligned with a respective at least one fuel orifice of the set of fuel orifices 534. Put another way, each swirler of the set of swirlers 520 can include at least one respective fuel orifice of the set of fuel orifices 534 that opens directly to the respective swirler. Alternatively, one or more swirlers of the set of swirlers 520 can be positioned such that no fuel orifice of the set of fuel orifices opens directly to the one or more swirlers.

The interior wall 540 is internally formed with or coupled to a respective portion of the fuel nozzle body 510. As a non-limiting example, the interior wall 540 can be separately formed from and subsequently coupled to the fuel nozzle body 510 through any suitable coupling method such as, but not limited to, welding, adhesion, fastening, threading, bonding, or the like.

During operation, a flow of compressed air (Fc) is fed to the central channel 514 through the fuel nozzle inlet 512. The set of swirlers 520 swirl the flow of compressed air (Fc) to define a flow of swirled air (Fs). A flow of fuel (Ff) is fed through the set of fuel channels 532, out the set of fuel orifices 534, and into the central channel 514. Specifically, a flow of fuel (Ff) is fed through the set of fuel orifices 534 and into the first swirler channel 542 and the second swirler channel 544. The flow of fuel (Ff) is mixed with the flow of swirled air (Fs) to define a mixed flow of fuel and air (Fm).

The injection of the flow of fuel (Ff) directly into the flow of swirled air (Fs) helps with ensuring that the flow of fuel (Ff) is fully mixed with the flow of swirled air (Fs). Put another way, the injection of the flow of fuel (Ff) directly into the flow of swirled air (Fs) helps with ensuring that the homogenous mixture of fuel and air is created.

Figure 13:
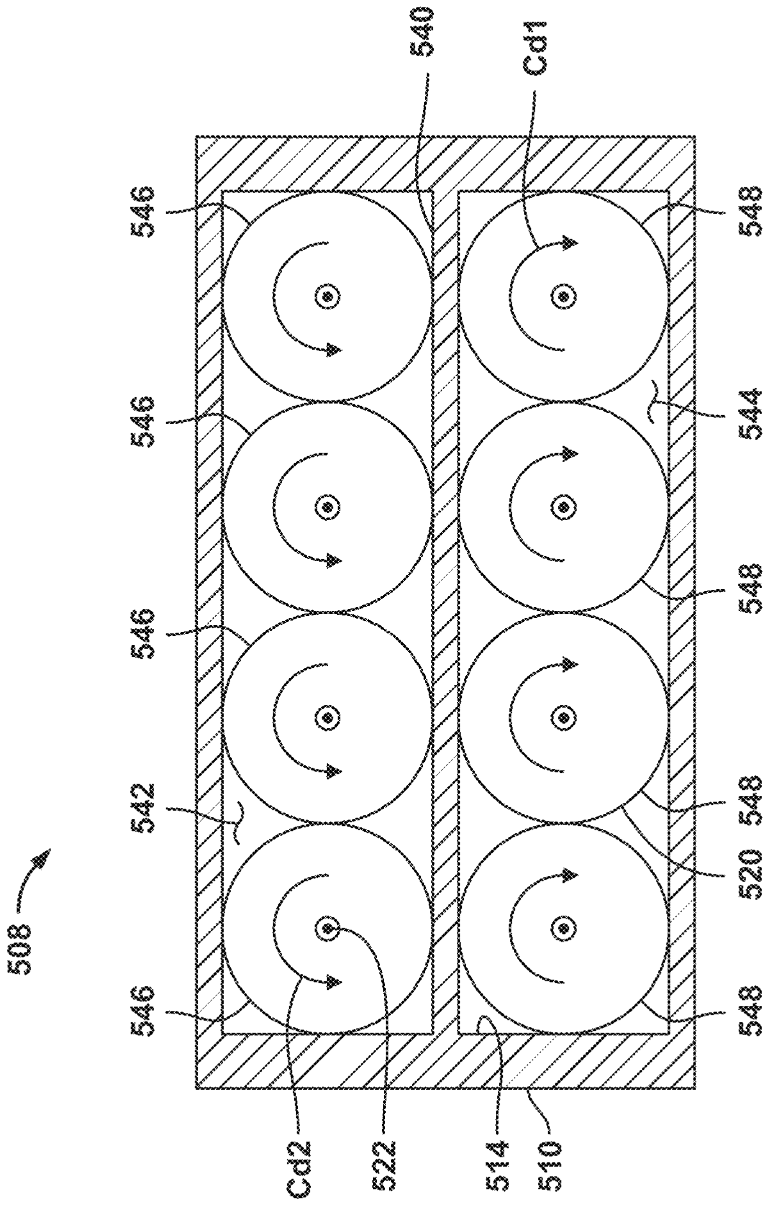
FIG. 13 is a schematic cross-sectional view of the fuel nozzle as seen from sectional line XIII-XIII of FIG. 12, further illustrating an arrangement of the set of swirlers within the first swirler channel and the second swirler channel in accordance with various aspects described herein.

FIG. 13 is a schematic cross-sectional view of the fuel nozzle 508 as seen from sectional line XIII-XIII of FIG. 12. The interior wall 540 extends between opposing ends of the fuel nozzle body 510. As such, the first swirler channel 542 is fluidly separate from the second swirler channel 544.

The fuel nozzle body 510, as illustrated, includes a rectangular cross section. It will be appreciated, however, that the fuel nozzle body 510 includes any suitable cross section such as, but not limited to, a circular cross section, a triangular cross section, a square cross section, a racetrack cross section, an oblong cross section, a hexagonal cross section, or the like. The first swirler channel 542, the second swirler channel 544, and any other swirler channel can have any suitable shape such as, but not limited to, a rectangle as illustrated.

The first set of swirlers 546 and the second set of swirlers 548 each include any number of one or more swirlers of the set of swirlers 520. The first set of swirlers 546 includes a total number of swirlers of the set of swirlers 520 equal to or non-equal to a total number of swirlers of the set of swirlers 520 in the second set of swirlers 548.

The set of swirlers 520, specifically the set of helical vanes 524 (FIG. 12), are oriented to direct the flow of compressed air (Fc) of FIG. 12 in a desired direction. The first set of swirlers 546 can each be oriented such that the flow of compressed air (Fc) flows in a first circumferential direction (Cd1). The second set of swirlers 548 can each be oriented such that the flow of compressed air (Fc) flows in a second circumferential direction (Cd2). The first circumferential direction (Cd1) is opposite the second circumferential direction (Cd2). It will be appreciated that the first set of swirlers 546 and the second set of swirlers 548 swirl the flow of compressed air (Fc) in one of either the first circumferential direction (Cd1) or the second circumferential direction (Cd2).

The use of the interior wall 540 to split the central channel 514 into the first swirler channel 542 and the second swirler channel 544 helps with creating turbulence within the flow of swirled air (Fs) of FIG. 12. The creation of turbulence, in turn, helps create the homogenous mixture of fuel and air.

Figure 14:
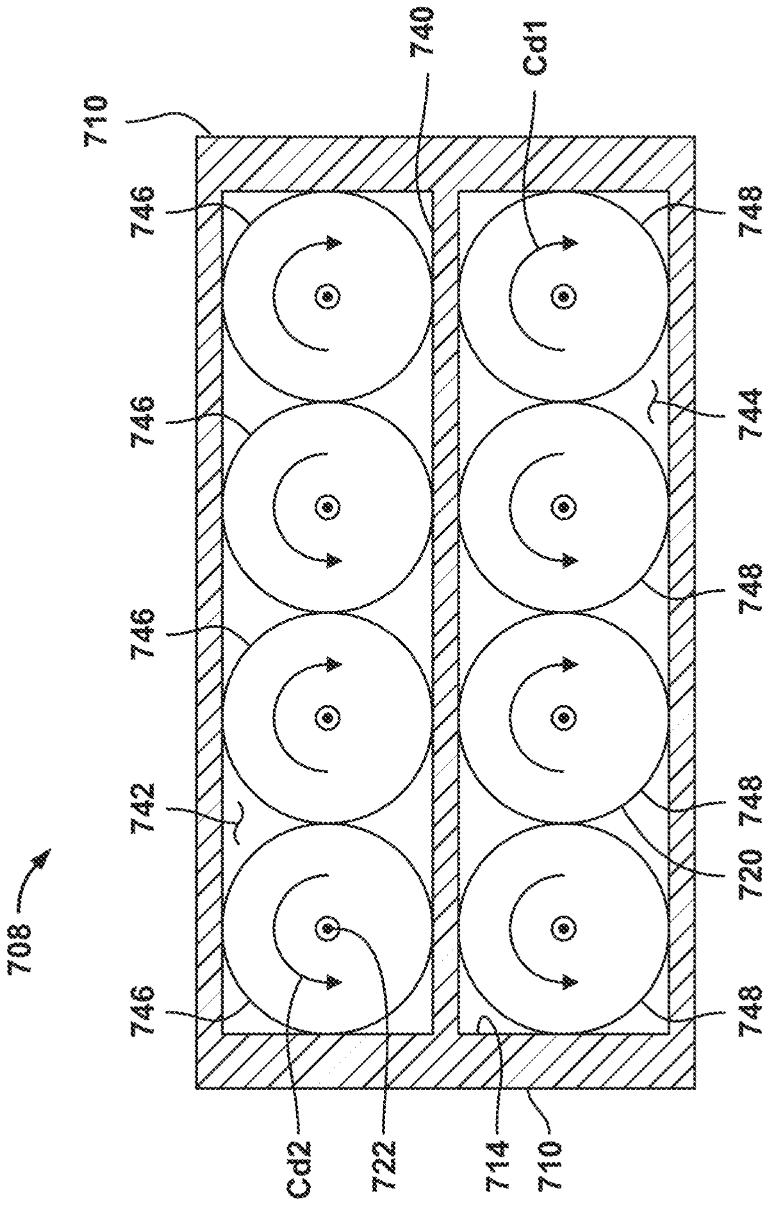
FIG. 14 is a schematic cross-sectional view of an exemplary fuel nozzle suitable for use within the combustion section of FIG. 3, further illustrating an arrangement of a set of swirlers within a first swirler channel and a second swirler channel in accordance with various aspects described herein.

FIG. 14 is a schematic cross-sectional view of an exemplary fuel nozzle 708 suitable for use within the combustion section 14 of FIG. 3. The fuel nozzle 708 is similar to the fuel nozzle 108 (FIG. 4), 508 (FIG. 12); therefore, like parts will be identified with like numerals increased to the 700 series with it being understood that the description of the fuel nozzle 108, 508 applies to the fuel nozzle 708 unless noted otherwise.

The fuel nozzle 708 has a fuel nozzle body 710. The fuel nozzle body 710 includes a central channel 714. The fuel nozzle 708 includes a set of swirlers 720. Each swirler of the set of swirlers 720 includes a body centerline 722. Each swirler of the set of swirlers 720 includes a set of helical vanes (not illustrated). The set of helical vanes extend radially from and wrap around the body centerline 722. Each swirler of the set of swirlers 720 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1620 of FIG. 10, the swirler 1720 of FIG. 11, the set of swirlers 520 of FIG. 12 or a combination thereof. It will be appreciated that the formation of the swirlers of the set of swirlers 720 can vary or be the same between the set of swirlers 720.

The fuel nozzle 708 is similar to the fuel nozzle 508 (FIG. 12) in that the fuel nozzle 708 includes an interior wall 740. The interior wall 740 splits a respective portion of the central channel 714 between a first swirler channel 742 and a second swirler channel 744. The set of swirlers 720 include a first set of swirlers 746 and a second set of swirlers 748.

During operation, the set of swirlers 720 swirl a flow of compressed air (e.g., the flow of compressed air (Fc) of FIG. 4 and FIG. 12). Like the fuel nozzle 508, the orientation of the set of swirlers 720 swirls the flow of compressed air in a first circumferential direction (Cd1) and a second circumferential direction (Cd2), opposite the first circumferential direction (Cd1). However, the first set of swirlers 746 and the second set of swirlers 748 are arranged and oriented such that directionality of the flow of swirled air (e.g., the flow of swirled air (Fs) of FIG. 4 and FIG. 12) varies within the first swirler channel 742 and the second swirler channel 744. As a non-limiting example, the first set of swirlers 746 and the second set of swirlers 748 are arranged in an alternating pattern within the first swirler channel 742 and the second swirler channel 744, respectively. As such, the flow of swirled air is alternately directed in the first circumferential direction (Cd1) and the second circumferential direction (Cd2) within the first swirler channel 742 and the second swirler channel 744, as illustrated.

The alternating pattern between the first circumferential direction (Cd1) and the second circumferential direction (Cd2) increases the turbulence of the flow of swirled air. The increase in turbulence, in turn, creates the homogenous mixture of fuel and air as discussed herein.

It will be appreciated that the pattern of the orientation of the set of swirlers 720 can be an evenly alternating pattern (e.g., A-B-A-B where A is every swirler of the set of swirlers 720 oriented in the first circumferential direction (Cd1) and B is every swirler of the set of swirlers 720 oriented in the second circumferential direction (Cd2)). Alternatively, the pattern of the orientation of the set of swirlers 720 can be a non-even alternating pattern (e.g., A-B-B-A, B-A-A-B, B-B-B-A, B-A-A-A, B-B-A-A-A-B, and so on). Put another way, the first set of swirlers 746 and the second set of swirlers 748 can alternately or non-alternately direct the flow of compressed air in the first circumferential direction (Cd1) and the second circumferential direction (Cd2).

Figure 15:
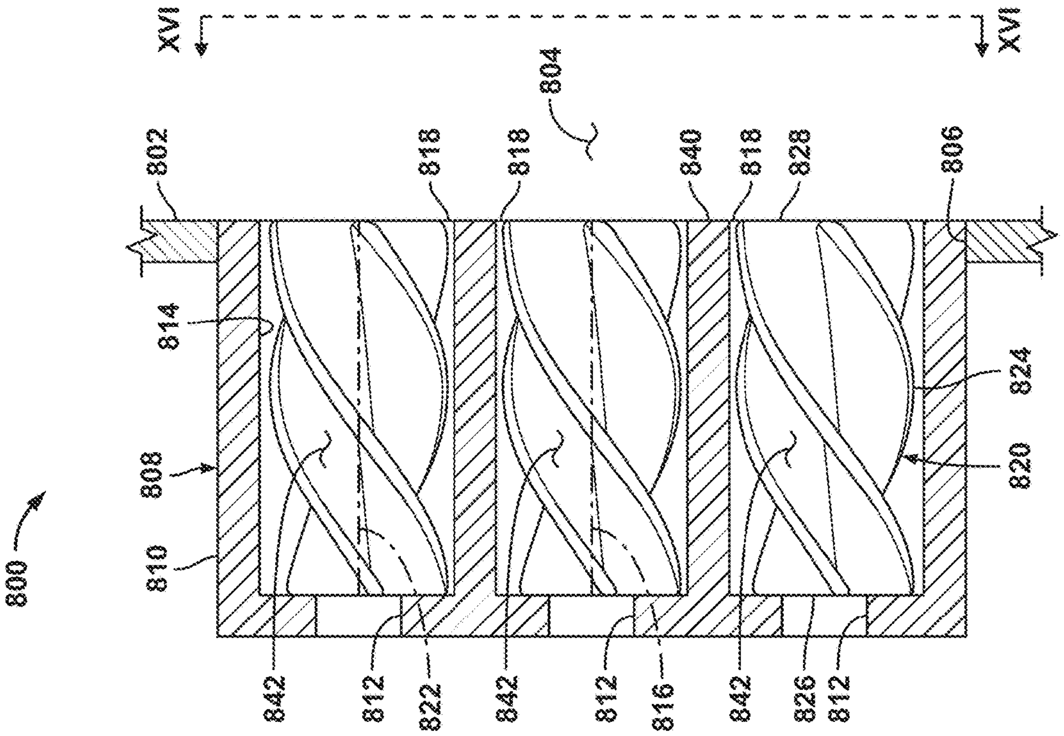
FIG. 15 is a schematic cross-sectional view of an exemplary combustion section suitable for use as the combustion section of FIG. 3, further comprising a fuel nozzle having a fuel nozzle body and a set of swirlers terminating at a fuel nozzle outlet in accordance with various aspects described herein.

FIG. 15 is a schematic cross-sectional view of an exemplary combustion section 800 suitable for use as the combustion section 14 of FIG. 3. The combustion section 800 is similar to the combustion section 100 (FIG. 4), 500 (FIG. 12); therefore, like parts will be identified with like numerals increased to the 800 series with it being understood that the description of the combustion section 100, 500 applies to the combustion section 800 unless noted otherwise.

The combustion section 800 includes a wall 802. The wall 802 at least partially defines a combustion chamber 804. The wall 802 includes a fuel nozzle opening 806. The combustion section 800 includes a fuel nozzle 808. The fuel nozzle 808 has a fuel nozzle body 810. The fuel nozzle 808 includes a fuel nozzle inlet 812 and a fuel nozzle outlet 818. A central channel 814 extends between the fuel nozzle inlet 812 and the fuel nozzle outlet 818. The fuel nozzle body 810 includes a nozzle centerline 816.

The fuel nozzle 808 includes a set of swirlers 820. The set of swirlers 820 include any number of one or more swirlers. Each swirler of the set of swirlers 820 includes a body centerline 822. Each swirler of the set of swirlers 820 includes a set of helical vanes 824. The set of helical vanes 824 extends radially from and wraps around the body centerline 822. Each helical vane of the set of helical vanes 824 extends axially between a first end 826 and a second end 828. The set of helical vanes 824 can include any number of two or more helical vanes 824. Each swirler of the set of swirlers 820 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1620 of FIG. 10, the swirler 1720 of FIG. 11, the set of swirlers 820 of FIG. 12, the set of swirlers 720 of FIG. 14, or a combination thereof. It will be appreciated that the formation of the swirlers of the set of swirlers 820 can vary or be the same between the set of swirlers 820.

The fuel nozzle 808, like the fuel nozzle 508 (FIG. 12), 708 (FIG. 14), includes an interior wall 840 extending from a respective portion of the fuel nozzle body 810. The interior wall 840 splits the central channel 814 into a set of swirler channels 842 including two or more swirler channels. Each swirler channel of the set of swirler channels 842 includes a respective set or group of swirlers of the set of swirlers 820. As illustrated, the set of swirler channels 842 includes three separate swirler channels that are radially stacked with respect to one another, and with respect to the nozzle centerline 816.

The interior wall 840 terminates at the fuel nozzle outlet 818. The set of swirlers 820 terminate at the fuel nozzle outlet 818. Put another way, the set of swirlers 820 extends through an entirety of the central channel 814.

While not illustrated, the fuel nozzle 808 can include a set of fuel channels (e.g., the set of fuel channels 132 of FIG. 4, 532 of FIG. 12) opening into the central channel 814 at a set of fuel orifices (e.g., the set of fuel orifices 134 of FIG. 4, 534 of FIG. 12) formed within or along any suitable portion of the fuel nozzle 808 as described herein. Alternatively, the set of fuel orifices can open directly into the combustion chamber 804 downstream of the set of swirlers 820.

Figure 16:
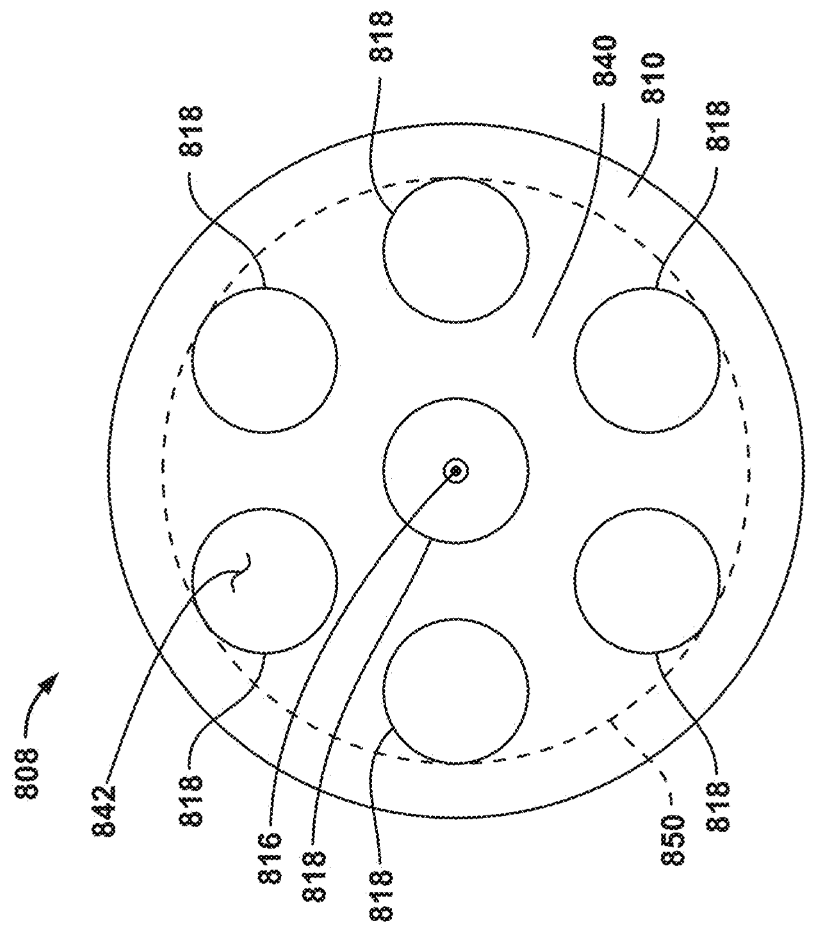
FIG. 16 is a schematic view of the fuel nozzle as seen from sight-line XVI-XVI of FIG. 15, further illustrating a circumferential arrangement of the set of swirlers in accordance with various aspects described herein.

FIG. 16 is a schematic view of the fuel nozzle 808 as seen from sight-line XVI-XVI of FIG. 15. For the purposes of illustration, a transition 850 (illustrated in phantom lines) has been shown between the interior wall 840 and the fuel nozzle body 810. For purposes of illustration, the set of swirlers 820 have been removed from the fuel nozzle 808.

The interior wall 840 can form a plate confronting the combustion chamber 804 (FIG. 15). A series of cutouts are provided along the interior wall 840 to define the fuel nozzle outlet 818. As illustrated, the fuel nozzle outlet 818 is defined by a series of discrete holes provided along the interior wall 840.

Each hole of the fuel nozzle outlet 818 is aligned with a respective one of the set of swirlers 820 (FIG. 15). As such, each swirler channel of the set of swirler channels 842 can define a discrete channel in which a single swirler of the set of swirlers 820 is provided within. Alternatively, any number of one or more swirlers of the set of swirlers 820 can be provided within a single swirler channel of the set of swirler channels 842. The set of swirler channels 842 can have any suitable shape such as, but not limited to, a circle as illustrated.

In relation to the fuel nozzle 508 (FIG. 13), 708 (FIG. 14), the fuel nozzle 808 has a circular array of swirler channels of the set of swirler channels 842, while the fuel nozzle 508, 708 each have a rectangular array of swirler channels of the set of swirler channels (e.g., the first swirler channel 542 (FIG. 13), 742 (FIG. 14), and the second swirler channel 544 (FIG. 13), 744 (FIG. 14)). It is contemplated that the most existing combustion sections utilize a fuel nozzle with a fuel nozzle body having a circular shape. As such, most existing combustion sections have fuel nozzle openings having a circular shape. As the fuel nozzle 808 is a circular shape, the fuel nozzle 808 is retrofittable into existing combustion sections. It will be appreciated that the fuel nozzle 808 is generally defined as a fuel nozzle 808 with the fuel nozzle body 810 that is shaped and sized to fit within existing combustion sections.

With reference to FIGS. 12-16, while the fuel nozzle body 510, 710, 810 at the fuel nozzle outlet 718, 718, 818 are shown to have a rectangular shape (e.g., FIG. 13 and FIG. 14) or a circular shape (FIG. 16), it will be appreciated that the fuel nozzle body 510, 710, 810 at the fuel nozzle outlet 718, 718, 818 can have any suitable shape. As a non-limiting example, the fuel nozzle body 510, 710, 810 at the fuel nozzle outlet 718, 718, 818 can have, but is not limited to, a rectangular shape, a circular shape, an ovular shape, a spiral shape, a shield shape, a trapezoidal shape, or the like.

Figure 17:
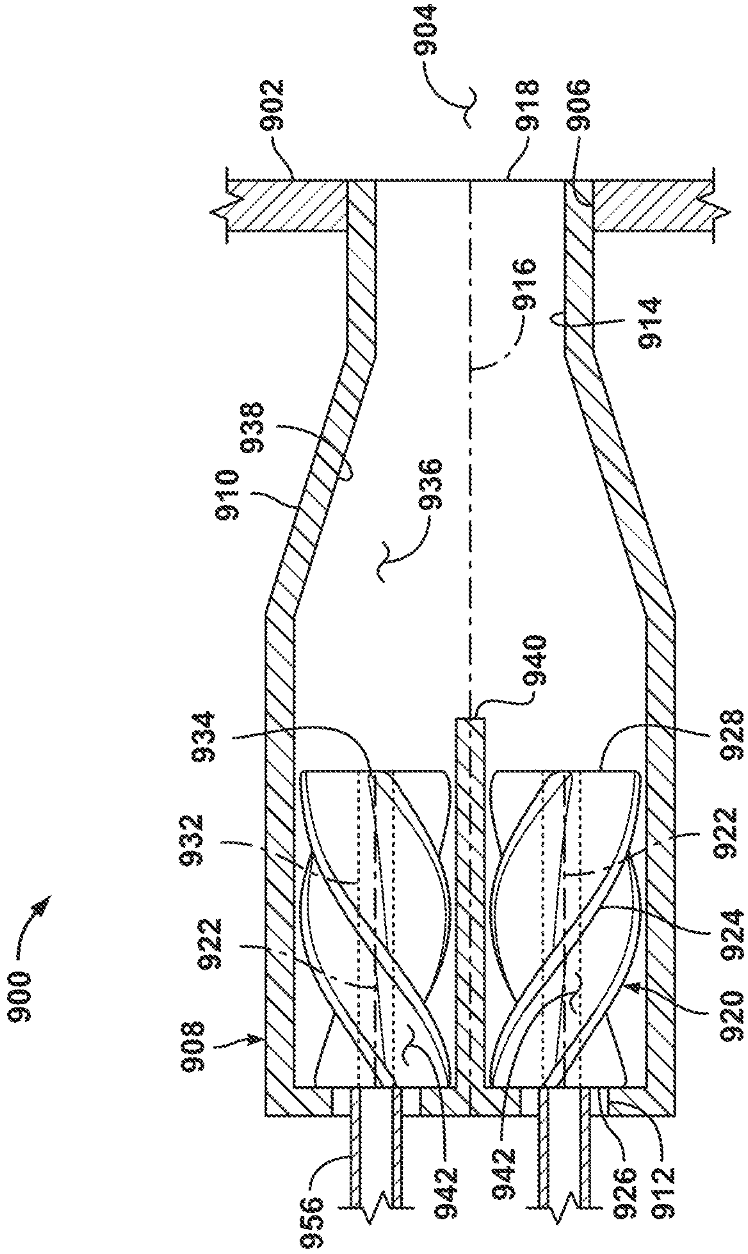
FIG. 17 is a schematic cross-sectional view of an exemplary combustion section suitable for use as the combustion section of FIG. 3, further comprising a fuel nozzle having a fuel nozzle body, a set of swirlers, and a swirler fuel channel in accordance with various aspects described herein.

FIG. 17 is a schematic cross-sectional view of an exemplary combustion section 900 suitable for use as the combustion section 14 of FIG. 3. The combustion section 900 is similar to the combustion section 100 (FIG. 4), 500 (FIG. 12), 800 (FIG. 16); therefore, like parts will be identified with like numerals increased to the 900 series with it being understood that the description of the combustion section 100, 500, 800 applies to the combustion section 900 unless noted otherwise.

The combustion section 900 includes a wall 902. The wall 902 at least partially defines a combustion chamber 904. The wall 902 includes a fuel nozzle opening 906. The combustion section 900 includes a fuel nozzle 908. The fuel nozzle 908 has a fuel nozzle body 910. The fuel nozzle 908 includes a fuel nozzle inlet 912 and a fuel nozzle outlet 918. A central channel 914 extends between the fuel nozzle inlet 912 and the fuel nozzle outlet 918. The fuel nozzle body 910 includes a nozzle centerline 916. The fuel nozzle body 910 includes a conic section 938 and a premixer 936.

The fuel nozzle 908 includes a set of swirlers 920. The set of swirlers 920 include any number of one or more swirlers. Each swirler of the set of swirlers 920 includes a body centerline 922. Each swirler of the set of swirlers 920 includes a set of helical vanes 924. The set of helical vanes 924 extends radially from and wraps around the body centerline 922. Each helical vane of the set of helical vanes 924 extends axially between a first end 926 and a second end 928. The set of helical vanes 924 can include any number of two or more helical vanes 924. Each swirler of the set of swirlers 920 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1620 of FIG. 10, the swirler 1720 of FIG. 11, the set of swirlers 520 of FIG. 12, the set of swirlers 520 of FIG. 13, the set of swirlers 820 of FIG. 16, or a combination thereof. It will be appreciated that the formation of the swirlers of the set of swirlers 920 can vary or be the same between the set of swirlers 920.

The fuel nozzle 908, like the fuel nozzle 108 (FIG. 4), 508 (FIG. 12), 708 (FIG. 14), 808 (FIG. 16), can include an interior wall 940 separating the central channel 914 into a set of swirler channels 942. The fuel nozzle 908, like the fuel nozzle 108 (FIG. 4), 508 (FIG. 12), includes a set of fuel channels 932 opening into the central channel 914 at a set of fuel orifices 934. The set of fuel channels 932, however, are formed within the set of swirlers 920 rather than the fuel nozzle body 910 or the interior wall 940. Alternatively, the set of fuel channels 932 can include portions extending through at least one of the fuel nozzle body 910, the interior wall 940, or a combination thereof. The set of fuel channels 932, or at least a portion of the set of fuel channels 932, can extend along the body centerline 922.

The set of fuel orifices 934 are formed along the set of swirlers 920. As a non-limiting example, the set of fuel orifices 934 are formed along a downstream end (e.g., the second end 928) of the set of swirlers 920 or otherwise of the set of helical vanes 924. It will be appreciated, however, that the set of fuel orifices 934 can be formed along any suitable portion of the set of swirlers 920. It will be appreciated that each swirler of the set of swirlers 920 or less than an entirety of the swirlers of the set of swirlers include a respective portion of the set of fuel channels 932 and the set of fuel orifices 934.

The fuel nozzle 908 can include a fuel manifold 956 that is fluidly coupled to the set of fuel channels 932. The fuel manifold 956 can extend through any suitable portion of the fuel nozzle 908. As the set of swirlers 920 can be aligned with the fuel nozzle inlet 912, the fuel manifold 956 can extend through a respective portion of the fuel nozzle inlet 912 and to the set of fuel channels 932.

The benefit of forming at least a portion of the set of fuel channels 932 and the set of fuel orifices 934 within or along at least a portion of the set of swirlers 920 is that the flow of fuel emitted from the set of fuel orifices 934 (e.g., the flow of fuel (Ff) of FIGS. 4 and 12) is exhausted directly into the flow of compressed air (e.g., the flow of compressed air (Fc) of FIGS. 4 and 12), the flow of swirled air (e.g., the flow of swirled air (Fs) of FIGS. 4 and 12), or a combination thereof. The direct injection of the flow of fuel increases the mixing efficiency of the flow of fuel within the flow of compressed air, thus ensuring that the mixed flow of air and fuel (e.g., the mixed flow of fuel and air (Fm) of FIGS. 4 and 12) is a homogenous mixture of fuel and air.

Figure 18:
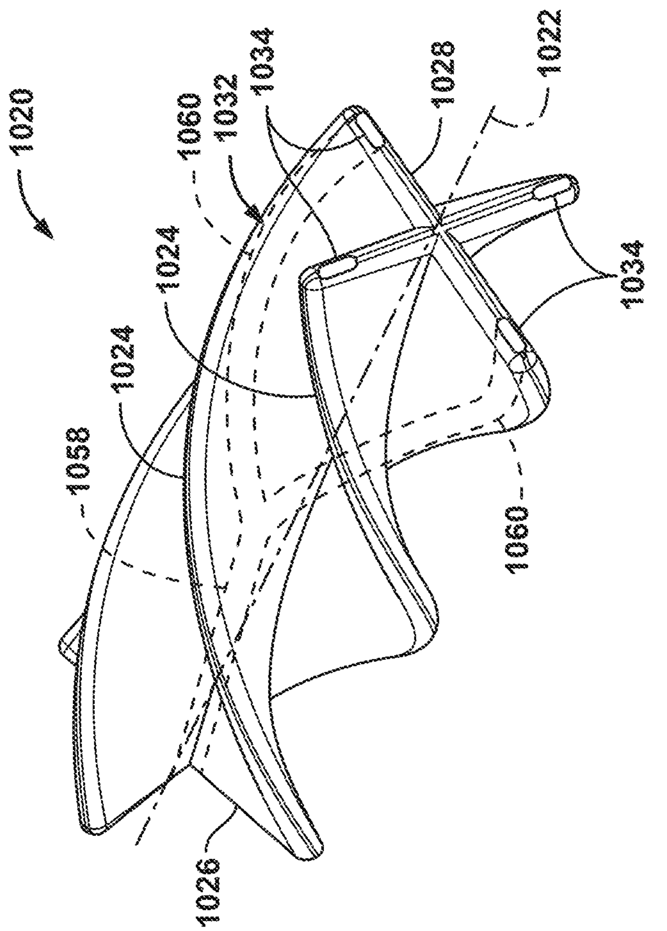
FIG. 18 is a schematic perspective view of a swirler of the set of swirlers of FIG. 16, further illustrating the swirler fuel channel extending through a respective portion of the swirler in accordance with various aspects described herein.

FIG. 18 is a schematic perspective view of an exemplary swirler 1020 suitable for use within the set of swirlers 120 of FIG. 4. The swirler 1020 is similar to the set of swirlers 120, 520 (FIG. 12), 720 (FIG. 14), 820 (FIG. 15), 920 (FIG. 17) and the swirler 220 (FIG. 7), 320 (FIG. 8), 420 (FIG. 9); therefore, like parts will be identified with like numerals increased to the 1000 series with it being understood that the description of the set of swirlers 120, 520, 720, 820, 920 and the swirler 220, 320, 420 applies to the swirler 1020 unless noted otherwise.

The swirler 1020 includes a body centerline 1022. The swirler 1020 includes a set of helical vanes 1024 extending radially from the body centerline 1022. Each helical vane of the set of helical vanes 1024 extends axially between a first end 1026 and a second end 1028, with respect to the body centerline 1022. The set of helical vanes 1024 wrap around the body centerline 1022 to form a helix. Each swirler of the set of swirlers 920 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1020 of FIG. 10, the swirler 1720 of FIG. 11, the set of swirlers 520 of FIG. 12, the set of swirlers 520 of FIG. 13, the set of swirlers 820 of FIG. 16, the set of swirlers 920 of FIG. 17, or a combination thereof. It will be appreciated that the formation of the swirlers of the set of swirlers 920 can vary or be the same between the set of swirlers 920.

The swirler 1020, like the set of swirlers 920, includes a fuel channel 1032 extending therethrough and opening to a set of fuel orifices 1034 provided along a respective portion of the set of helical vanes 1024. The set of fuel orifices 1034, however, are formed along a portion of the second end 1028 that is provided radially outward from the body centerline 1022. As a non-limiting example, the set of helical vanes 1024 can each include a respective fuel orifice of the set of fuel orifice 1034 formed along the second end 1028.

The fuel channel 1032 can include a main branch 1058 and a set of legs 1060 branching out from the main branch 1058 and leading directly to the set of fuel orifices 1034. Alternatively, each fuel orifice of the set of fuel orifices 1034 can include a single fuel channel 1032 that leads directly to the respective fuel orifice of the set of fuel orifices 1034.

Figure 19:
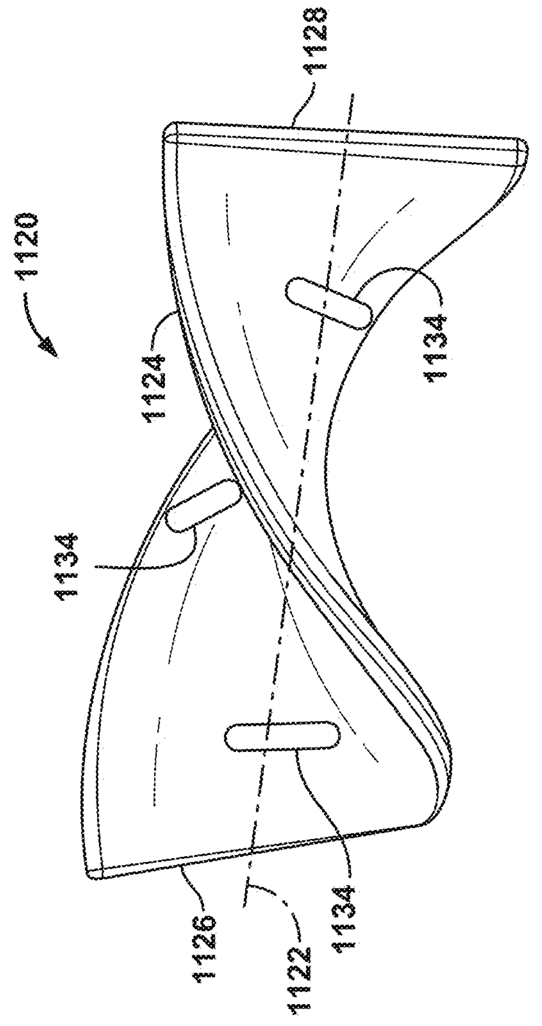
FIG. 19 is a schematic perspective view of an exemplary swirler suitable for use within the set of swirlers of FIG. 4, further illustrating a set of fuel orifices provided along the swirler in accordance with various aspects described herein.

FIG. 19 is a schematic perspective view of an exemplary swirler 1120 suitable for use within the set of swirlers 120 of FIG. 4. The swirler 1120 is similar to the set of swirlers 120, 520 (FIG. 12), 720 (FIG. 14), 820 (FIG. 15), 920 (FIG. 17) and the swirler 220 (FIG. 7), 320 (FIG. 8), 420 (FIG. 9), 1020 (FIG. 17); therefore, like parts will be identified with like numerals increased to the 1100 series with it being understood that the description of the set of swirlers 120, 520, 720, 820, 920 and the swirler 220, 320, 420, 1020 applies to the swirler 1120 unless noted otherwise.

The swirler 1120 includes a body centerline 1222. The swirler 1120 includes a set of helical vanes 1124 extending radially from the body centerline 1222. Each helical vane of the set of helical vanes 1124 extends axially between a first end 1126 and a second end 1128, with respect to the body centerline 1222. The set of helical vanes 1124 wraps around the body centerline 1222 to form a helix. Each swirler of the set of swirlers 920 can include any feature or component of any swirler described herein such as, but not limited to, the swirler 120 of FIG. 1, the swirler 220 of FIG. 7, the swirler 320 of FIG. 8, the swirler 420 of FIG. 9, the swirler 1120 of FIG. 11, the swirler 1720 of FIG. 11, the set of swirlers 520 of FIG. 12, the set of swirlers 520 of FIG. 13, the set of swirlers 820 of FIG. 16, the set of swirlers 920 of FIG. 17, or a combination thereof. It will be appreciated that the formation of the swirlers of the set of swirlers 920 can vary or be the same between the set of swirlers 920.

The swirler 1120, like the swirler 920 (FIG. 16), 1020 (FIG. 18), includes a respective portion of the fuel channel (not illustrated, e.g., the fuel channel 1032 of FIG. 18) that opens along a respective portion of the swirler 1120 at a set of fuel orifices 1134. The set of fuel orifices 1134 are provided along any suitable portion of the set of helical vanes 1124. As a non-limiting example, the set of fuel orifices 1134 are provided axially between the first end 1126 and the second end 1128, with respect to the body centerline 1222. The set of fuel orifices 1134 can be, for example, axially or radially spaced along on a single helical vane of the set of helical vanes 1124 or along two or more helical vanes of the set of helical vanes 1124.

The benefit of providing the set of fuel orifices 1134 along the set of helical vanes 1124 axially between the first end 1126 and the second end 1128 is that the set of fuel orifices 1134 open circumferentially, with respect to the body centerline 1222. Put another way, the set of fuel orifices 1134 are arranged such that a flow of fuel (e.g., the flow of fuel (Ff) of FIGS. 4 and 12) are emitted circumferentially with respect to the body centerline 1222. As such, the flow of fuel is exhausted directly into a streamline airflow of compressed air (e.g., the flow of compressed air (Fc) of FIGS. 4 and 12) that is flowing over the set of helical vanes 1124. This, in turn, ensures that the flow of fuel is adequately mixed with the flow of compressed air to define a homogenous mixture of fuel and air.

Figure 20:
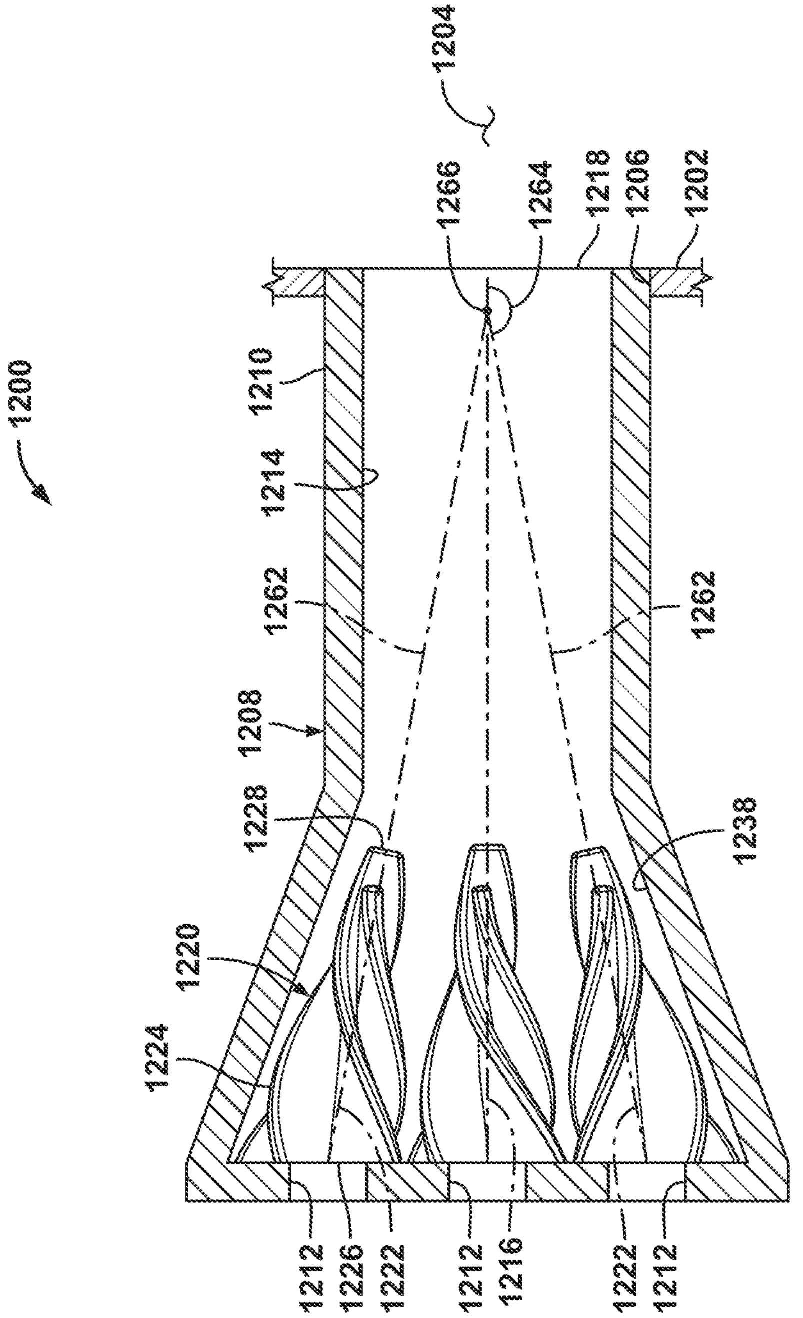
FIG. 20 is a schematic cross-sectional view of an exemplary combustion section suitable for use as the combustion section of FIG. 3, further comprising a fuel nozzle having a fuel nozzle body and a set of swirlers, the set of swirlers being conical swirlers in accordance with various aspects described herein.

FIG. 20 is a schematic cross-sectional view of an exemplary combustion section 1200 suitable for use as the combustion section 14 of FIG. 3. The combustion section 1200 is similar to the combustion section 100 (FIG. 4), 500 (FIG. 12), 800 (FIG. 16), 900 (FIG. 17); therefore, like parts will be identified with like numerals increased to the 1200 series with it being understood that the description of the combustion section 100, 500, 800, 900 applies to the combustion section 1200 unless noted otherwise.

The combustion section 1200 includes a wall 1202. The wall 1202 at least partially defines a combustion chamber 1204. The wall 1202 includes a fuel nozzle opening 1206. The combustion section 1200 includes a fuel nozzle 1208. The fuel nozzle 1208 has a fuel nozzle body 1210. The fuel nozzle 1208 includes a fuel nozzle inlet 1212 and a fuel nozzle outlet 1218. A central channel 1214 extends between the fuel nozzle inlet 1212 and the fuel nozzle outlet 1218. The fuel nozzle body 1210 includes a nozzle centerline 1216.

The fuel nozzle 1208 includes a set of swirlers 1220. The set of swirlers 1220 include any number of one or more swirlers. Each swirler of the set of swirlers 1220 includes a body centerline 1222. Each swirler of the set of swirlers 1220 includes a set of helical vanes 1224. The set of helical vanes 1224 extends radially from and wraps around the body centerline 1222. Each helical vane of the set of helical vanes 1224 extends axially between a first end 1226 and a second end 1228. The set of helical vanes 1224 can include any number of two or more helical vanes 1224. Each swirler of the set of swirlers 1220 can include any feature or component of any swirler described herein such as, but not limited to, the swirler 120 of FIG. 1, the swirler 220 of FIG. 7, the swirler 320 of FIG. 8, the swirler 420 of FIG. 12, the swirler 1620 of FIG. 10, the swirler 1720 of FIG. 11, the set of swirlers 520 of FIG. 12, the set of swirlers 520 of FIG. 13, the set of swirlers 820 of FIG. 16, the set of swirlers 920 of FIG. 17, the swirler 1020 of FIG. 18, the swirler 1120 of FIG. 19, or a combination thereof. It will be appreciated that the formation of the swirlers of the set of swirlers 1220 can vary or be the same between the set of swirlers 1220. While not illustrated, the fuel nozzle 1208 can include a set of fuel channels (e.g., the set of fuel channels 132 (FIG. 4), 532 (FIG. 12), 932 (FIG. 17), 1032 (FIG. 18)) opening at a respective set of fuel orifices (e.g., the set of fuel orifices 134 (FIG. 4), 534 (FIG. 12), 934 (FIG. 17), 1034 (FIG. 18), 1134 (FIG. 19)).

The fuel nozzle 1208, like the fuel nozzle 108 (FIG. 4), 508 (FIG. 12), 708 (FIG. 14), 808 (FIG. 15), 908 (FIG. 17), includes a conic section 1238. The set of swirlers 1220, however, are provided within a region of the central channel 1214 defined by the conic section 1238. The swirlers 1220 are sized to fit within the region of the central channel 1214 defined by the conic section 1238. As such, the set of swirlers 1220 each converge radially inward from an upstream portion (e.g., the first end 1226) and to a downstream portion (e.g., the second end 1228) with respect to the body centerline 1222. Put another way, a radial height of each swirler of the set of swirlers 1220, with respect to the body centerline 1222, decreases from a first portion and to a second portion, with the second portion being downstream of the first portion. The set of swirlers 1220; therefore, are defined as conical swirlers.

The set of swirlers 1220 is arranged such that a projection 1262 of the body centerline 1222 from at least two swirlers of the set of swirlers 1220 intersect at an intersection point 1266. As illustrated, each projection 1262 intersects the nozzle centerline 1216 at a single intersection point 1266. The intersection point 1266 can be provided along the nozzle centerline 1216. The intersection point 1266 can be offset from the nozzle centerline 1216. The intersection point 1266 can be provided within the central channel 1214. The intersection point 1266 can be provided within the combustion chamber 1204. The intersection point 1266 can coincide with the fuel nozzle outlet 1218.

Each projection 1262 intersects the nozzle centerline 1216 and forms a swirler angle 1264 with respect to the nozzle centerline 1216. The swirler angle 1264 has an absolute value of greater than or equal to 120 degrees and less than or equal to 180 degrees.

The benefit of having the fuel nozzle 1208 with conical swirlers is that the footprint of the fuel nozzle 1208 is smaller than, with respect to the fuel nozzle 108, 508. The reduced footprint, in turn, reduces the weight of the combustion section 1200. Further, the use of the fuel nozzle 1208 increases mixing capabilities by directing two or more flows of fluid within the fuel nozzle 1208 (e.g., the flow of swirled air (Fs) of FIG. 4) towards a common point (e.g., the intersection point 1266).

Figure 21:
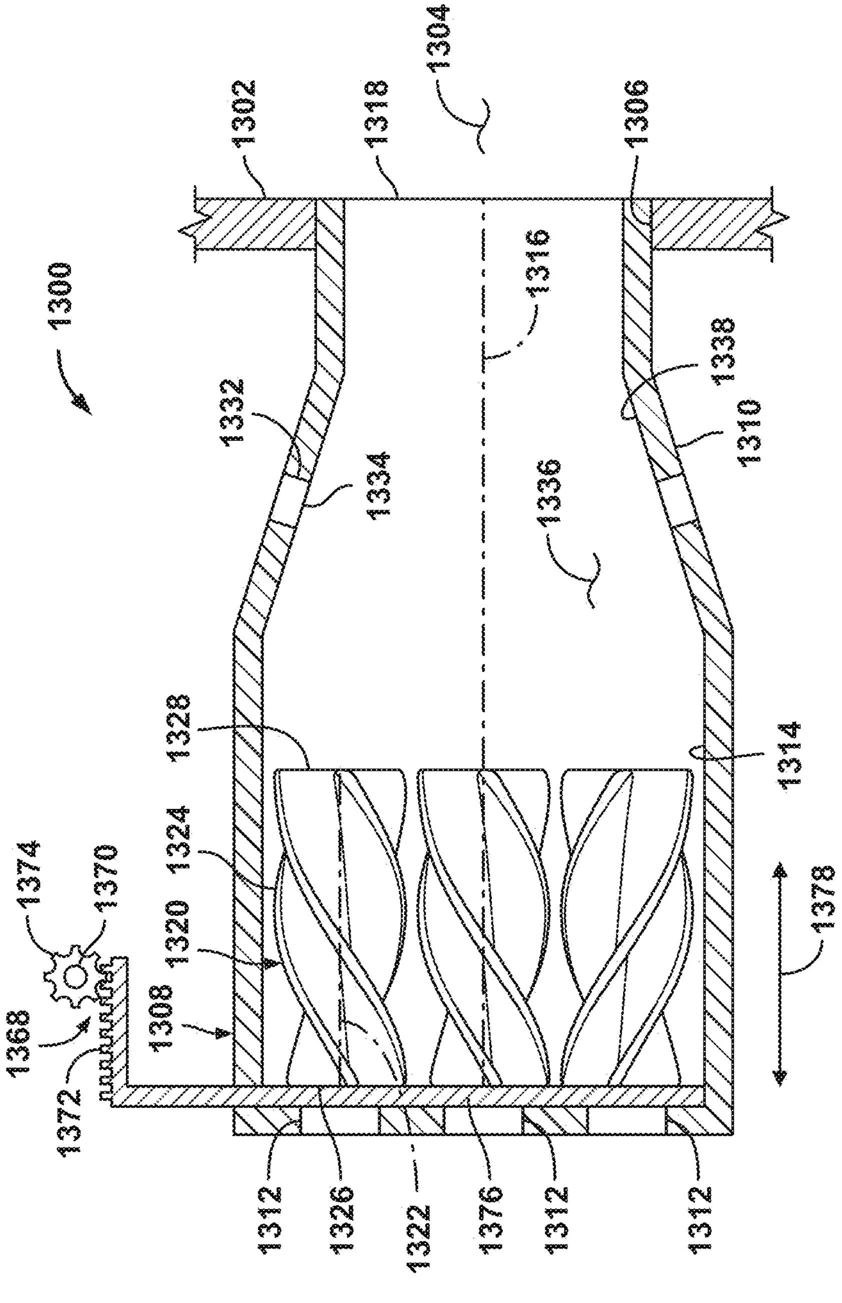
FIG. 21 is a schematic cross-sectional view of an exemplary combustion section suitable for use as the combustion section of FIG. 3, further comprising a fuel nozzle having a fuel nozzle body and a set of swirlers, the set of swirlers being moveable in accordance with various aspects described herein.

FIG. 21 is a schematic cross-sectional view of an exemplary combustion section 1300 suitable for use as the combustion section 14 of FIG. 3. The combustion section 1300 is similar to the combustion section 100 (FIG. 4), 500 (FIG. 12), 800 (FIG. 16), 900 (FIG. 17), 1200 (FIG. 20); therefore, like parts will be identified with like numerals increased to the 1300 series with it being understood that the description of the combustion section 100, 500, 800, 900, 1200 applies to the combustion section 1300 unless noted otherwise.

The combustion section 1300 includes a wall 1302. The wall 1302 at least partially defines a combustion chamber 1304. The wall 1302 includes a fuel nozzle opening 1306. The combustion section 1300 includes a fuel nozzle 1308. The fuel nozzle 1308 has a fuel nozzle body 1310. The fuel nozzle 1308 includes a fuel nozzle inlet 1312 and a fuel nozzle outlet 1318. A central channel 1314 extends between the fuel nozzle inlet 1312 and the fuel nozzle outlet 1318. The fuel nozzle body 1310 includes a nozzle centerline 1316. The fuel nozzle body 1310 includes a conic section 1338 and a premixer 1336. The fuel nozzle 1308 includes a set of fuel channels 1332. The set of fuel channels 1332 open to the central channel 1314 at a set of fuel orifices 1334.

The fuel nozzle 1308 includes a set of swirlers 1320. The set of swirlers 1320 include any number of one or more swirlers. Each swirler of the set of swirlers 1320 includes a body centerline 1322. Each swirler of the set of swirlers 1320 includes a set of helical vanes 1324. The set of helical vanes 1324 extends radially from and wraps around the body centerline 1322. Each helical vane of the set of helical vanes 1324 extends axially between a first end 1326 and a second end 1328. The set of helical vanes 1324 can include any number of two or more helical vanes 1324. Each swirler of the set of swirlers 1320 can include any feature or component of any swirler described herein such as, but not limited to, the swirler 120 of FIG. 1, the swirler 220 of FIG. 7, the swirler 320 of FIG. 8, the swirler 420 of FIG. 13, the swirler 1620 of FIG. 10, the swirler 1720 of FIG. 11, the set of swirlers 520 of FIG. 13, the set of swirlers 520 of FIG. 13, the set of swirlers 820 of FIG. 16, the set of swirlers 920 of FIG. 17, the swirler 1020 of FIG. 18, the swirler 1120 of FIG. 19, the set of swirlers 1320 of FIG. 20, or a combination thereof. It will be appreciated that the formation of the swirlers of the set of swirlers 1320 can vary or be the same between the set of swirlers 1320.

The fuel nozzle 1308, like the fuel nozzle 108 (FIG. 4), 508 (FIG. 12), 708 (FIG. 14), 808 (FIG. 15), 908 (FIG. 17), 1208 (FIG. 20), incudes the set of swirlers 1320. The set of swirlers 1320, however, are moveable along a plane of movement 1378 within the central channel 1314. The plane of movement 1378 is any suitable direction. As a non-limiting example, the plane of movement 1378 is axially with respect to the nozzle centerline 1316. The set of swirlers 1320 are axially moveable with respect to the body centerline 1322.

The movement of the set of swirlers 1320 along the plane of movement 1378 is achieved through use of an actuator 1368. The actuator 1368 is any suitable actuator 1368 operably coupled to the set of swirlers 1320 and being configured to move the set of swirlers 1320 along the plane of movement 1378. As a non-limiting example, the actuator 1368 can include a motor 1370, a rack 1372, and a pinion 1374. The motor 1370 can rotate the pinion 1374, which can cause movement of the rack 1372. The rack 1372 can be coupled to a linkage system 1376 that is directly coupled to the set of swirlers 1320. Movement of the rack 1372, via the pinion 1374 and the motor 1370, causes the linkage system 1376, and thus the set of swirlers 1320, to move along the plane of movement 1378. The linkage system 1376 includes any number of one more linkages or arms.

The benefit of having the set of swirlers 1320 that are axially moveable along the plane of movement 1378 is that the mixing length of the fuel nozzle 1308 can be dynamically adjusted. It will be appreciated that the fuel nozzle 1308 can have multiple mixing lengths as the set of swirlers 1320 can be independently moveable with respect to one another. As used herein, the mixing length is the axial straight-line distance between the second end 1328 of a respective swirler of the set of swirlers 1320 and the fuel nozzle outlet 1318. It is contemplated that the mixing length can be varied based on the operation or need of the combustion section 1300.

For example, during high-load conditions of the combustion section 1300 (e.g., during takeoff of an aircraft including a turbine engine having the combustion section 1300), the mixing length can be increased by moving the set of swirlers 1320 to the left (away from the fuel nozzle outlet 1318) as illustrated. Moving the set of swirlers 1320 axially farthest from the fuel nozzle outlet 1318 increases the mixing length, which in turn increases the time or space that the fuel and the air have to mix. This, in turn, results in a more homogenous mixture of fuel and air, and therefore less NOx emissions, when compared to the fuel nozzle 1308 when configured with a small mixing length.

As another example, during low-load conditions of the combustion section 1300 (e.g., during cruise or normal flight of the aircraft), it is advantageous to have rich pockets of fuel and air (e.g., larger concentrations of fuel) in order to ensure that the mixture of fuel and air can be ignited. As such, the set of swirlers 1320 can be moved such that the mixing length is small (e.g., the second end 1328 is axially closer to the fuel nozzle outlet 1318 than when the large mixing length is used). Using the short mixing length gives the fuel and air less space or time to mix, thus resulting in large concentrations of fuel within the mixture of fuel and air. The large concentrations of fuel are more easily ignited than a mixture of fuel and air having smaller concentrations of fuel.

Minimizing the mixing length is especially advantageous when utilizing H2 fuel as the fuel. For example, minimizing the mixing length of the fuel nozzle 1308 minimizes the areas within the fuel nozzle 1308 that the H2 fuel can form pockets. Minimizing the pockets within the fuel nozzle 1308, in turn, reduces the risk of flashback into the fuel nozzle 1308.

Figure 22:
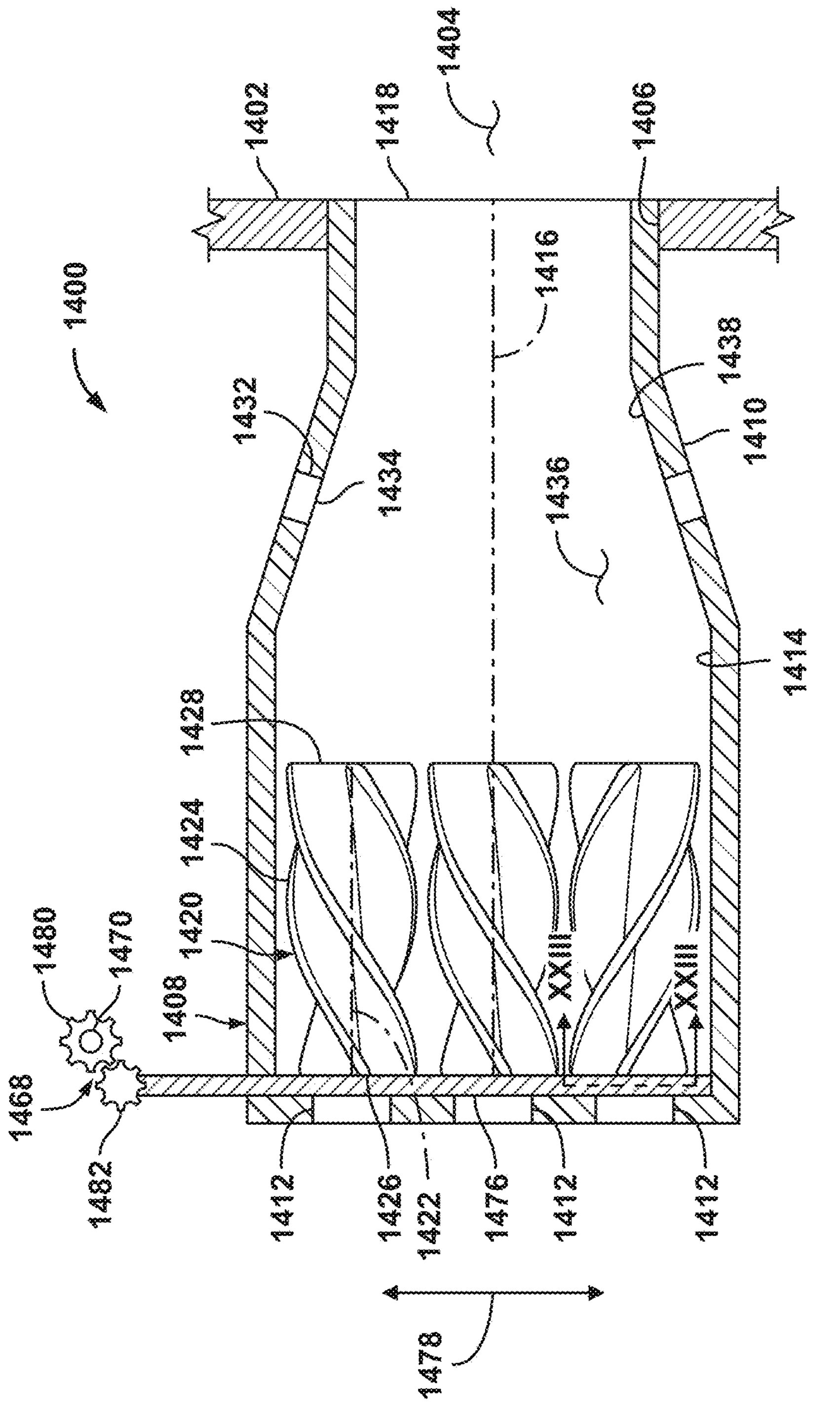
FIG. 22 is a schematic cross-sectional view of an exemplary combustion section suitable for use as the combustion section of FIG. 3, further comprising a fuel nozzle having a fuel nozzle body and a set of swirlers, the set of swirlers being moveable in accordance with various aspects described herein.

FIG. 22 is a schematic cross-sectional view of an exemplary combustion section 1400 suitable for use as the combustion section 14 of FIG. 3. The combustion section 1400 is similar to the combustion section 100 (FIG. 4), 500 (FIG. 12), 800 (FIG. 16), 900 (FIG. 17), 1200 (FIG. 20), 1300 (FIG. 21); therefore, like parts will be identified with like numerals increased to the 1400 series with it being understood that the description of the combustion section 100, 500, 800, 900, 1200, 1300 applies to the combustion section 1400 unless noted otherwise.

The combustion section 1400 includes a wall 1402. The wall 1402 at least partially defines a combustion chamber 1404. The wall 1402 includes a fuel nozzle opening 1406. The combustion section 1400 includes a fuel nozzle 1408. The fuel nozzle 1408 has a fuel nozzle body 1410. The fuel nozzle 1408 includes a fuel nozzle inlet 1412 and a fuel nozzle outlet 1418. A central channel 1414 extends between the fuel nozzle inlet 1412 and the fuel nozzle outlet 1418. The fuel nozzle body 1410 includes a nozzle centerline 1416. The fuel nozzle body 1410 includes a conic section 1438 and a premixer 1436. The fuel nozzle 1408 includes a set of fuel channels 1432. The set of fuel channels 1432 open to the central channel 1414 at a set of fuel orifices 1434.

The fuel nozzle 1408 includes a set of swirlers 1420. The set of swirlers 1420 include any number of one or more swirlers. Each swirler of the set of swirlers 1420 includes a body centerline 1422. Each swirler of the set of swirlers 1420 includes a set of helical vanes 1424. The set of helical vanes 1424 extends radially from and wraps around the body centerline 1422. Each helical vane of the set of helical vanes 1424 extends axially between a first end 1426 and a second end 1428. The set of helical vanes 1424 can include any number of two or more helical vanes 1424. Each swirler of the set of swirlers 1420 can include any feature or component of any swirler described herein such as, but not limited to, the swirler 120 of FIG. 1, the swirler 220 of FIG. 7, the swirler 320 of FIG. 8, the swirler 420 of FIG. 14, the swirler 1620 of FIG. 10, the swirler 1720 of FIG. 11, the set of swirlers 520 of FIG. 13, the set of swirlers 720 of FIG. 14, the set of swirlers 820 of FIG. 16, the set of swirlers 920 of FIG. 17, the swirler 1020 of FIG. 18, the swirler 1120 of FIG. 19, the set of swirlers 1420 of FIG. 20, or a combination thereof. It will be appreciated that the formation of the swirlers of the set of swirlers 1420 can vary or be the same between the set of swirlers 1420.

The fuel nozzle 1408, like the fuel nozzle 1308 (FIG. 21), incudes the set of swirlers 1420 moveable along a plane of movement 1478 within the central channel 1414. The plane of movement 1478 is any suitable direction. As a non-limiting example, the plane of movement 1478 is circumferentially about a respective body centerline 1422. The set of swirlers 1420 are circumferentially moveable with respect to the body centerline 1422.

The movement of the set of swirlers 1420 along the plane of movement 1478 is achieved through use of an actuator 1468. The actuator 1468 is any suitable actuator 1468 operably coupled to the set of swirlers 1420 and being configured to move the set of swirlers 1420 along the plane of movement 1478. As a non-limiting example, the actuator 1468 can include a motor 1470, a first gear 1480 and a second gear 1482. The motor 1470 can rotate the first gear 1480, which can rotate the second gear 1482. Rotation of the second gear 1482 causes movement of a linkage system 1476 coupled to the set of swirlers 1420. The linkage system 1476 includes any number of one more linkages or arms.

Figure 23:
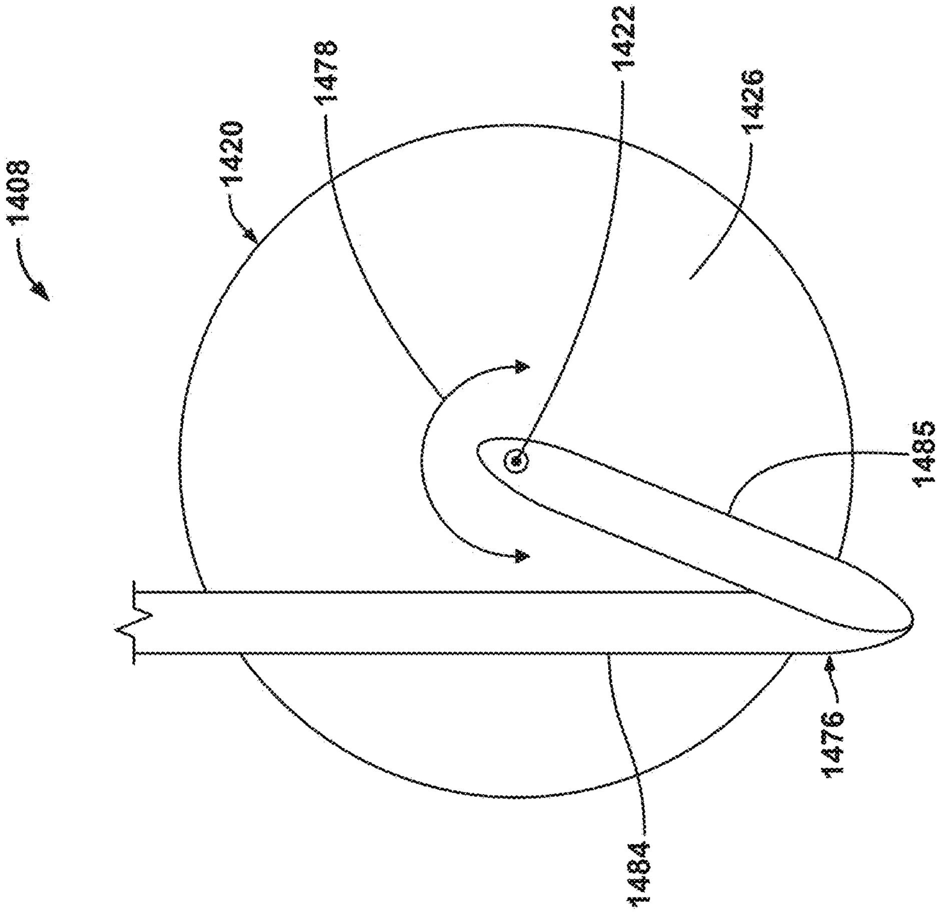
FIG. 23 is a schematic view of a swirler of the set of swirlers as seen from sight-line XXIII-XXIII of FIG. 22, further comprising a linkage arm in accordance with various aspects described herein.

FIG. 23 is a schematic view of a swirler of the set of swirlers 1420 as seen from sight-line XXIII-XXIII of FIG. 22. FIG. 23 illustrates a non-limiting example of the linkage system 1476. The linkage system 1476, as illustrated, includes a first arm 1484 and a second arm 1485. The second arm 1485 can be coupled to the swirler at a point corresponding to the body centerline 1422. Movement of the first arm 1484 and the second arm 1485 cause rotation of the swirler of the set of swirlers 1420 about the plane of movement 1478.

While shown as being rotatable about a single plane of movement 1478, it will be appreciated that one or more swirler of the set of swirlers 1420 can be moveable about two or more planes of movement 1478. As a non-limiting example, at least one swirler of the set of swirlers 1420 can be moveable circumferentially and axially about the body centerline 1422.

Figure 24:
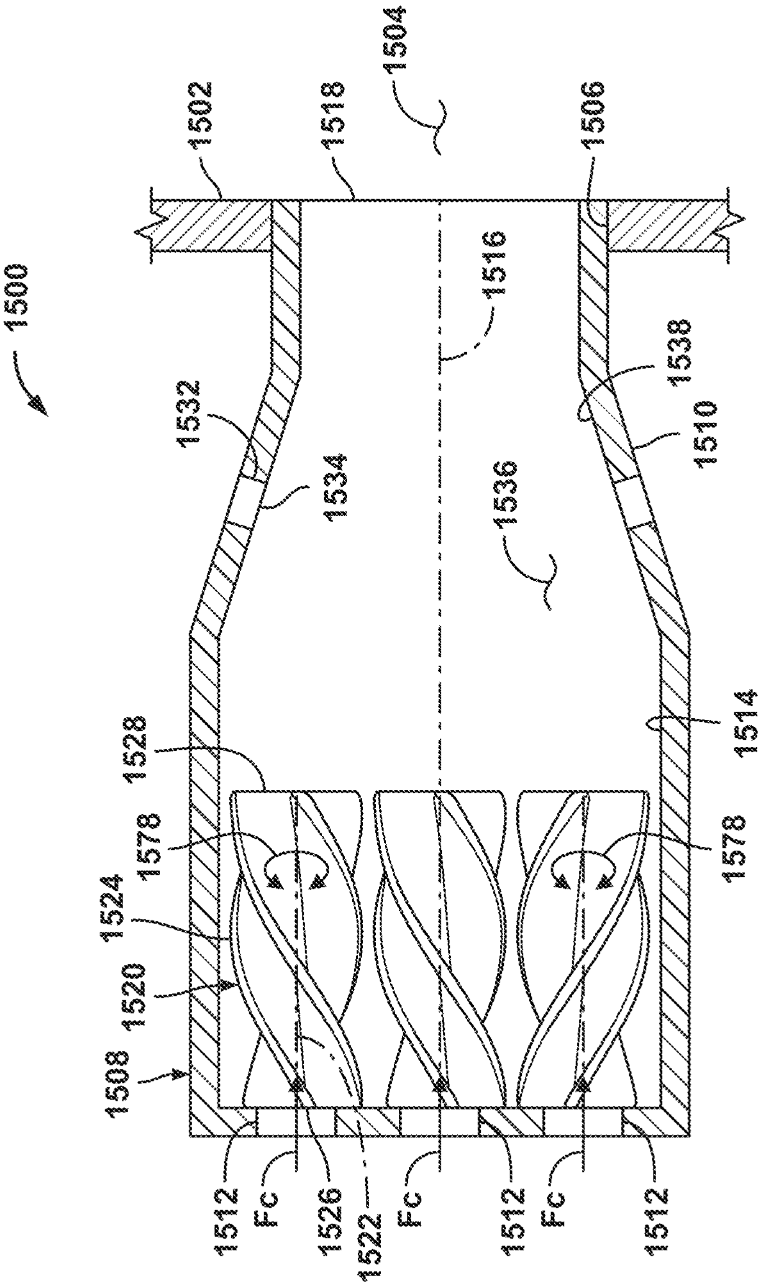
FIG. 24 is a schematic cross-sectional view of an exemplary combustion section suitable for use as the combustion section of FIG. 3, further comprising a fuel nozzle having a fuel nozzle body and a set of swirlers, the set of swirlers being moveable in accordance with various aspects described herein.

FIG. 24 is a schematic cross-sectional view of an exemplary combustion section 1500 suitable for use as the combustion section 15 of FIG. 3. The combustion section 1500 is similar to the combustion section 100 (FIG. 4), 500 (FIG. 12), 800 (FIG. 16), 900 (FIG. 17), 1200 (FIG. 20), 1300 (FIG. 21), 1400 (FIG. 22); therefore, like parts will be identified with like numerals increased to the 1500 series with it being understood that the description of the combustion section 100, 500, 800, 900, 1200, 1300, 1400 applies to the combustion section 1500 unless noted otherwise.

The combustion section 1500 includes a wall 1502. The wall 1502 at least partially defines a combustion chamber 1504. The wall 1502 includes a fuel nozzle opening 1506. The combustion section 1500 includes a fuel nozzle 1508. The fuel nozzle 1508 has a fuel nozzle body 1510. The fuel nozzle 1508 includes a fuel nozzle inlet 1512 and a fuel nozzle outlet 1518. A central channel 1514 extends between the fuel nozzle inlet 1512 and the fuel nozzle outlet 1518. The fuel nozzle body 1510 includes a nozzle centerline 1516. The fuel nozzle body 1510 includes a conic section 1538 and a premixer 1536. The fuel nozzle 1508 includes a set of fuel channels 1532. The set of fuel channels 1532 open to the central channel 1514 at a set of fuel orifices 1534.

The fuel nozzle 1508 includes a set of swirlers 1520. The set of swirlers 1520 include any number of one or more swirlers. Each swirler of the set of swirlers 1520 includes a body centerline 1522. Each swirler of the set of swirlers 1520 includes a set of helical vanes 1524. The set of helical vanes 1524 extends radially from and wraps around the body centerline 1522. Each helical vane of the set of helical vanes 1524 extends axially between a first end 1526 and a second end 1528. The set of helical vanes 1524 can include any number of two or more helical vanes 1524. Each swirler of the set of swirlers 1520 can include any feature or component of any swirler described herein such as, but not limited to, the swirler 120 of FIG. 1, the swirler 220 of FIG. 7, the swirler 320 of FIG. 8, the swirler 420 of FIG. 15, the swirler 1620 of FIG. 10, the swirler 1720 of FIG. 11, the set of swirlers 520 of FIG. 13, the set of swirlers 720 of FIG. 14, the set of swirlers 820 of FIG. 16, the set of swirlers 920 of FIG. 17, the swirler 1020 of FIG. 18, the swirler 1120 of FIG. 19, the set of swirlers 1520 of FIG. 20, or a combination thereof. It will be appreciated that the formation of the swirlers of the set of swirlers 1520 can vary or be the same between the set of swirlers 1520.

The fuel nozzle 1508, like the fuel nozzle 1308 (FIG. 21), 1408 (FIG. 22), incudes the set of swirlers 1520 moveable along a plane of movement 1578 within the central channel 1514. The plane of movement 1578 is any suitable direction. As a non-limiting example, the plane of movement 1578 is circumferential about a respective body centerline 1522. The difference, however, is that the movement of the set of swirlers 1520 is achieved without use of an actuator (e.g., the actuator 1468 (FIG. 21), 1568 (FIG. 22)). Instead, the movement along the plane of movement 1578 is achieved through the flowing of compressed air (e.g., the flow of compressed air (Fc) of FIGS. 4 and 12) over the set of swirlers 1520. At least a portion of the set of swirlers 1520, specifically the set of helical vanes 1524 of the portion of the set of swirlers 1520, are oriented such that the flowing of the compressed air over the set of helical vanes 1524 causes rotation of the respective set of swirlers 1520. It will be appreciated that each swirler of the set of swirlers 1520 can be moveable in the same or differing circumferential directions. For example, a first swirler of the set of swirlers 1520 can be oriented (e.g., the helical vane 1524 of the first swirler can be oriented) such that the first swirler moves in a first circumferential direction, while a second swirler of the set of swirlers 1520 can be oriented such that the second swirler moves in a second circumferential direction, opposite the first circumferential direction.

It is contemplated that the set of swirlers 1520 can be moveable through other mechanisms such as through an interaction between the set of swirlers 1520 and a flow of fuel (e.g., the flow of fuel (Ff) of FIGS. 4 and 12). As a non-limiting example, the set of fuel channels 1532 can be oriented such that the flow of fuel is directed towards the set of swirlers 1520 and contacts at least a portion of the set of swirlers 1520. The contact between the flow of fuel and the set of swirlers 1520 can cause the set of swirlers 1520 to move along the plane of movement 1578. The amount that the set of swirlers 1520 move can then be dependent on the momentum of the flow of fuel. As such, during low-load conditions where the flow of fuel has a low momentum, the set of swirlers 1520 will move less than during high-load conditions where the momentum of the fuel is higher. Put another way, the rotational speed of the set of swirlers 1520 can vary based on the load condition (e.g., low-load versus high-load) of the combustion section 1500.

As a non-limiting example, the set of swirlers 1520 can include helical vanes 1524 having a set of fuel orifices formed along the helical vane 1524 (e.g., the set of fuel orifices 1134 of FIG. 19) that are oriented to push the set of swirlers 1520 in the plane of movement 1578. As a non-limiting example, at least a portion of the helical vanes 1524 of the set of swirlers 1520 can include structures provided along the helical vanes 1524 that cause the flow of compressed air (e.g., the flow of compressed air (Fc)) to flow in a certain direction and cause at least a portion of the set of swirlers 1520 to move in the plane of movement 1578 or any other plane of movement 1378 (FIG. 21), 1478 (FIG. 22). The structures can be, for example, vortex generators (e.g., the set of vortex generators 1686 of FIG. 10), an airfoil, a wall, a divot, or the like.

With reference to FIGS. 21-24, it will be appreciated that various moveable configurations of the set of swirlers 1320, 1420, 1520 are contemplated. As a non-limiting example, an exemplary fuel nozzle can include a first swirler axially moveable (e.g., the set of swirlers 1320), and a second swirler circumferentially moveable (e.g., the set of swirlers 1420, 1520). As a non-limiting example, an exemplary fuel nozzle can include a first set of swirlers that are moveable swirlers (e.g., the set of swirlers 1320, 1420, 1520) and a second set of swirlers that are stationary (e.g., do not move). It is contemplated that using a combination of moveable and stationary swirlers increases the shear between moving and non-moving swirlers, thus increasing the turbulence of the flow of swirled air (e.g., flow of swirled air (Fs) of FIG. 4).

It is contemplated that the use of the swirlers 1320, 1420, 1520 limit the possibility of flashback or flame holding. As used herein, flame holding refers to the tendency for an ignited fuel and air mixture to hold to or stick to a wall. Flame holding is more likely to occur if the fuel and air is moving at a relatively low velocity. Flame holding can cause the wall that the flame is held to to become overly heated and damage the wall or other components of the combustion section 1300, 1400, 1500 over time. The movement of the set of swirlers 1320, 1420, 1520 has been found to eliminate or otherwise greatly reduce the possibility of slow-moving pockets of fuel and air from forming within the fuel and air mixture. Specifically, the movement of the set of swirlers 1320, 1420, 1520 (axially, radially or circumferentially) causes the flow of compressed air (e.g., the flow of compressed air (Fc) of FIG. 4) to be sped up and for the flow of compressed air to have a relatively uniform velocity throughout. As such, the movement of the set of swirlers 1320, 1420, 1520 helps to ensure that the mixture of fuel and air is fully exhausted from the fuel nozzle 1308, 1408, 1508 to minimize the possibility of flashback while being at a high enough velocity to minimize the possibility of flame holding.

It is further contemplated that the fuel nozzle 1310, 1410, 1510 can include any number of actuators 1368, 1468. For example, the fuel nozzle 1508 includes no actuators, while the fuel nozzle 1310, 1410 includes one actuator 1368, 1468. It will be appreciated, however, that an exemplary fuel nozzle can include two or more actuators. As a non-limiting example, the exemplary fuel nozzle can include a first group of swirlers coupled to a first actuator, and a second group of swirlerf (s coupled to a second actuator, separate from the first actuator. As such, the first group of swirlers can be moved independently from the second group of swirlers.

It will be appreciated that the set of swirlers 1320, 1420, 1520 can be moved in any other suitable direction such as, but not limited to, radially with respect to the nozzle centerline 1316, 1416, 1516. It will be further appreciated that a single swirler can be moveable in two or more planes of movement. As a non-limiting example, the single swirler can be moveable axially (e.g., the set of swirlers 1320) and radially such that the single swirler is moveable diagonally.

With some aspects, the disclosed combustion section and fuel nozzles can be utilized with gaseous fuel, such as hydrogen. Gaseous fuel, including hydrogen, spreads/disperses at a faster rate than atomized liquid fuel, which can involve less mixing time for the gaseous fuel, fuel mixing tube lengths can be shorter, and the flame from the gaseous fuel may be more likely to spread farther and faster, which can increase the risk of blowout, flashback and increase the impact of controlling the flame and limiting flame spread by controlling the dispersion of the gaseous fuel.

Many other possible aspects and configurations in addition to those shown in the above figures are contemplated by the present disclosure. For example, the disclosed fuel nozzles can provide greater flame stability, lower flame temperatures, and lower NOx emissions relative to other designs.

The use of the set of swirlers ensures a homogenous mixture of fuel and air is created. The homogeneous mixture is especially important when utilizing H2 fuels. Specifically, the creation of the homogenous mixture ensures that flashback will not occur and that the flame generated through combustion of the mixed flow of fuel and air has a uniform temperature distribution.

While described with respect to a turbine engine, it should be appreciated that the combustor as described herein can be for any engine with a having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure. For example, and without limitation, combustors and combustion sections can include various combinations swirlers. In some examples, the same combustion section can include fuel nozzles with any combination of the configurations illustrated in FIGS. 4-24.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A combustion section for a turbine engine, the combustion section comprising a wall at least partially forming a combustion chamber, a fuel nozzle that opens to the combustion chamber through the wall, the fuel nozzle comprising a fuel nozzle body defining a central channel exhausting into the combustion chamber at a fuel nozzle outlet, and a swirler provided within the central channel, the swirler having a body centerline and a helical vane extending from the body centerline, the helical vane wrapped circumferentially about the body centerline greater than or equal to $\pi/2$ radians between a first end and a second end, axially opposing the first end, of the helical vane.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, the central channel having a centerline, a first swirler provided within the central channel, and a second swirler provided within the second channel axially forward of the first swirler.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, and a swirler provide within the central channel, the swirler including a body centerline, an upstream portion and a downstream portion provided axially aft of the upstream portion, the swirler converging radially inward from the upstream portion and to the downstream portion.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, the central channel having a centerline, and a swirler provide within the central channel, the swirler including a body centerline, the body centerline intersecting the centerline at a non-zero acute angle.

A turbine engine comprising a compression section, a combustion section, and a turbine section in serial flow arrangement, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, the central channel having a centerline, a first swirler provided within the central channel, the first swirler having a first body centerline and a first helical vane extending circumferentially in a first circumferential direction about the first body centerline, and a second swirler provided within the central channel, the second swirler having a second body centerline and a second helical vane extending circumferentially in a second circumferential direction about the second body centerline, the second circumferential direction being opposite the first circumferential direction.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, and a swirler provided within the central channel, the swirler having a fuel channel opening at a fuel orifice provided along the swirler.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, and a swirler provide within the central channel, the swirler including a body centerline, an upstream end, a downstream end provided axially aft of the upstream end, and a fuel channel, the fuel channel exhausting into the central channel at a fuel orifice provided along the swirler axially between the upstream end and the downstream end of the swirler.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, and a swirler provide within the central channel, the swirler including a body centerline, and a vortex generator provided along the swirler, the vortex generator configured to create a pair of opposing vortices on along circumferentially opposing sides of the vortex generator.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, the central channel having a centerline, a swirler provide within the central channel, and a fuel supply channel exhausting into the central channel at a fuel outlet, the fuel supply channel being oriented such that a flow of fuel exhausted into the central channel through the fuel supply channel is directed towards the swirler. A combustion section for a turbine engine, the combustion section comprising a wall at least partially forming a combustion chamber, and a fuel nozzle that opens to the combustion chamber through the wall, the fuel nozzle comprising a fuel nozzle body defining a central channel exhausting into the combustion chamber at a fuel nozzle outlet, the central channel having a centerline, the fuel nozzle body including an interior wall extending through a respective portion of the central channel to define a swirler channel between eth interior wall and a confronting portion of the fuel nozzle body, and a swirler provided within the swirler channel.

A combustion section for a turbine engine, the combustion section comprising a wall at least partially forming a combustion chamber, and a fuel nozzle that opens to the combustion chamber through the wall, the fuel nozzle comprising a fuel nozzle body defining a central channel exhausting into the combustion chamber at a fuel nozzle outlet, and a swirler provided within the central channel, the swirler having a body centerline, the swirler being moveable within the central channel about a plane of movement.

A combustion section for a turbine engine, the combustion section comprising a wall at least partially forming a combustion chamber, and a fuel nozzle that opens to the combustion chamber through the wall, the fuel nozzle comprising a fuel nozzle body including a central channel exhausting into the combustion chamber at a fuel nozzle outlet, and a swirler provide within the central channel, the swirler including a body centerline, a first vane and a second vane, the first vane and the second vane each extending axially between a first end and a second end with the second edge of the first vane being axially offset from the second edge of the second vane.

A combustion section for a turbine engine, the combustion section comprising a wall at least partially forming a combustion chamber, and a fuel nozzle that opens to the combustion chamber through the wall, the fuel nozzle comprising a fuel nozzle body inkling a central channel exhausting into the combustion chamber at a fuel nozzle outlet, and a swirler provide within the central channel, the swirler including a body centerline, and a vane extending axially between a first end and a second end, with the first end axially coinciding with a portion of the dome wall.

The combustion section of any preceding clause, wherein the swirler includes at least two helical vanes forming at least a double helix.

The combustion section of any preceding clause, wherein the second end of a first vane of the at least two helical vanes is axially spaced an axial distance, with respect to the body centerline, from the second end of a second vane of the at least two helical vanes.

The combustion section of any preceding clause, wherein the first end of the first helical vane axially corresponds to the first end of the second helical vane.

The combustion section of any preceding clause, wherein the first helical vane is defined by a circumferential thickness, with respect to the body centerline, and the second end of the first helical vane is axially offset a length from the second end of the second helical vane, the length being greater than 0 times and less than or equal to 20 times the circumferential thickness.

The combustion section of any preceding clause, wherein the at least two helical vanes includes more than two helical vanes.

The combustion section of any preceding clause, wherein the swirler includes two helical vanes.

The combustion section of any preceding clause, wherein the swirler includes four helical vanes.

The combustion section of any preceding clause, wherein the swirler extends a total axial distance along the body centerline, with the axial distance being greater than or equal to 0% and less than or equal to 50% of the total axial distance.

The combustion section of any preceding clause, wherein the first end and the second end of a first helical vane of the at least two helical vanes axially corresponds to the first end and the second end of a second helical vane of the at least two helical vanes.

The combustion section of any preceding clause, wherein the fuel nozzle includes a fuel channel extending through a portion of the swirler, the fuel channel including a fuel orifice opening into the central channel and being provided along the swirler.

The combustion section of any preceding clause, wherein the fuel channel extends along the body centerline.

The combustion section of any preceding clause, wherein the fuel orifice is included within a set of fuel orifices, the fuel channel includes a main channel and a set of branches branching from respective portions of the main channel and opening to the central channel at a respective fuel orifice for the set of fuel orifices.

The combustion section of any preceding clause, wherein the helical vane is included within at least two helical vanes, with each helical vane of the set of helical vanes including a respective portion of the set of branches.

The combustion section of any preceding clause, wherein the fuel orifice is included in a plurality of fuel orifices opening into the central channel along the swirler.

The combustion section of any preceding clause, wherein the plurality of fuel orifices are provided axially between a first end and a second end of the swirler, the second end being downstream of the first end.

The combustion section of any preceding clause, wherein the fuel orifice is provided along the second end of the helical vane.

The combustion section of any preceding clause, wherein the fuel orifice is provided along a portion of the helical vane axially between the first end and the second end.

The combustion section of any preceding clause, wherein the fuel orifice is provided along the body centerline.

The combustion section of any preceding clause, wherein the helical vane includes at least two helical vanes, and the fuel orifice includes a plurality of fuel orifices, with each second end of the at least two helical vanes having at least one fuel orifice of the plurality of fuel orifices.

The combustion section of any preceding clause, wherein the swirler is a first swirler included in a set of swirlers, the first swirler including the helical vane wrapped in a first circumferential direction, with respect to the body centerline of the first swirler, and a second swirler includes the helical vane wrapped in a second circumferential direction, opposite the first circumferential direction, with respect to the body centerline of the second swirler.

The combustion section of any preceding clause, wherein the first swirler is provided downstream the second swirler.

The combustion section of any preceding clause, wherein an upstream end of the first swirler touches a downstream end of the second swirler.

The combustion section of any preceding clause, wherein the body centerline of the first swirler is aligned with the body centerline of the second swirler.

The combustion section of any preceding clause, wherein the first swirler is provided radially adjacent to the second swirler, with respect to the body centerline of the first swirler.

The combustion section of any preceding clause, wherein the fuel nozzle includes an interior wall extending through the central channel and splitting the central channel into a first swirler channel and a second swirler channel.

The combustion section of any preceding clause, wherein the first swirler is provided within the first swirler channel and the second swirler is provided within the second swirler channel.

The combustion section of any preceding clause, wherein the first swirler is provide within a plurality of first swirlers provided within the first swirler channel.

The combustion section of any preceding clause, wherein each swirler of the first plurality of swirlers is oriented to direct a flow of compressed air in a first circumferential direction.

The combustion section of any preceding clause, wherein at least one swirler of the first plurality of swirlers is oriented to direct a flow of compressed air in a first circumferential direction, and at least one swirler of the of the first plurality of swirlers is oriented to direct a flow of compressed air in a second circumferential direction, opposite the first circumferential direction.

The combustion section of any preceding clause, wherein the first plurality of swirler alternately direct the flow of compressed air in the first circumferential direction and the second circumferential direction.

The combustion section of any preceding clause wherein the first plurality of swirlers non-alternately direct the flow of compressed air in the first circumferential direction and the second circumferential direction.

The combustion section of any preceding clause, wherein the set of swirlers include a first plurality of swirlers provided within the first swirler channel, with each swirler in the first plurality of swirlers including the helical vane wrapped in the first circumferential direction, and a second plurality of swirlers provided within the second swirler channel, with each swirler in the second plurality of swirlers including the helical vane wrapped in the second circumferential direction.

The combustion section of any preceding clause, wherein the first swirler channel and the second swirler channel are rectangular.

The combustion section of any preceding clause, wherein the first swirler channel and the second swirler channel are circular.

The combustion section of any preceding clause, wherein the fuel nozzle includes an interior wall extending through the central channel and splitting the central channel into a first swirler channel and a second swirler channel, the first swirler being provided within the first swirler channel and the second swirler being provided within the second swirler channel.

The combustion section of any preceding clause, wherein the interior wall extends into the central channel to the fuel nozzle outlet.

The combustion section of any preceding clause, wherein the fuel nozzle includes a fuel channel orifice opening to the central channel at a fuel orifice, the fuel channel being at least partially formed within the interior wall.

The combustion section of any preceding clause, wherein the fuel channel directs a flow of fluid radially inward, with respect to the body centerline of the swirler.

The combustion section of any preceding clause, wherein at least a portion of the fuel channel is provided within the fuel nozzle body.

The combustion section of any preceding clause, wherein the swirler includes a vortex generator provided along the helical vane.

The combustion section of any preceding clause, wherein the vortex generator is one of a counter-rotating vortex generator, a double-sided wedge, wheeler, wing, winglet, Kuethe, wishbone, hairpin, lobed, wave-type, or any combination thereof.

The combustion section of any preceding clause, wherein the vortex generator is included within a plurality of vortex generators spaced along the swirler.

The combustion section of any preceding clause, wherein a first vortex generator of the plurality of vortex generators is axially offset from a second vortex generator of the plurality of vortex generators.

The combustion section of any preceding clause, wherein the swirler converges radially inward, with respect to the body centerline, from an upstream portion and to a downstream portion of the swirler.

The combustion section of any preceding clause, wherein the upstream portion is an upstream end and the downstream portion is a downstream end.

The combustion section of any preceding clause, wherein the swirler constantly converges from the upstream portion and to the downstream portion.

The combustion section of any preceding clause, wherein the swirler non-constantly converges from the upstream portion and to the downstream portion.

The combustion section of any preceding clause, wherein the swirler is included within a set of swirlers including a first swirler and a second swirler.

The combustion section of any preceding clause, wherein the swirler is included in a plurality of swirlers, with at least one swirler of the plurality of swirlers configured to direct a flow of compressed air in a first circumferential direction, and a second swirler of the plurality of swirlers configured to direct a flow of compressed air in a second circumferential direction, opposite the first circumferential direction.

The combustion section of any preceding clause, wherein the fuel nozzle body includes a nozzle centerline, and the swirler is axially offset from or coincides with the fuel nozzle outlet.

The combustion section of any preceding clause, wherein swirler terminates at the fuel nozzle outlet.

The combustion section of any preceding clause, wherein the swirler is included in a plurality of swirlers, with each swirler terminating at a respective portion of the fuel nozzle outlet.

The combustion section of any preceding clause, wherein the swirler is moveable.

The combustion section of any preceding clause, wherein the swirler is axially moveable with respect to the body centerline.

The combustion section of any preceding clause, wherein the swirler is circumferentially moveable about the body centerline.

The combustion section of any preceding clause, wherein the swirler is moveable through a flow of compressed air flowing over the swirler.

The combustion section of any preceding clause, wherein the swirler is moveable through an actuator.

The combustion section of any preceding clause, wherein the actuator includes a linkage system and a motor, the linkage system coupling the motor and the swirler.

The combustion section of any preceding clause, wherein the swirler is included within a plurality of swirlers, with the linkage system being coupled to two or more swirlers of the plurality of swirlers.

The combustion section of any preceding clause, wherein the swirler is a first swirler included within a set of swirlers, the set of swirlers including at least one static swirler.

The combustion section of any preceding clause, wherein the swirler includes at least two vanes forming a double helix.

The combustion section of any preceding clause, wherein the swirler is axially and circumferentially moveable with respect to the body centerline.

The combustion section of any preceding clause, wherein the swirler is included in a plurality of swirlers including a first set of swirlers and a second set of swirlers.

The combustion section of any preceding clause, wherein the first set of swirlers are independently moveable with respect to the second set of swirlers.

The combustion section of any preceding clause, wherein the first set of swirlers is moveable via a first actuator, and the second set of swirlers is moveable via a second actuator.

The combustion section of any preceding clause, wherein the first set of swirlers are moveable and the second set of swirlers are static.

The combustion section of any preceding clause, wherein the first set of swirlers are moveable in a first circumferential direction and the second set of swirlers are moveable in a second circumferential direction, opposite the first circumferential direction.

The combustion section of any preceding clause, wherein the swirler is moveable at varying speeds based on a load condition of the combustion section.

The combustion section of any preceding clause, wherein the swirler is radially moveable.

The combustion section of any preceding clause, wherein the swirler is moveable about two or more planes of movement.

The combustion section of any preceding clause, wherein the fuel nozzle further comprises a fuel channel.

The combustion section of any preceding clause, wherein the fuel channel is oriented such that a flow of fuel exiting the fuel channel contacts the swirler and causes the swirler to move.

The combustion section of any preceding clause, wherein the swirler is circumferentially moveable about the body axis.

The combustion section of any preceding clause, wherein a variation of a momentum of the flow of fuel causes the swirler to move at varying speeds, with a higher momentum causing the swirler to move faster than a lower momentum.

The combustion section of any preceding clause, wherein the swirler comprises a fuel channel opening along the swirler at a fuel orifice.

The combustion section of any preceding clause, wherein the fuel orifice is oriented to cause the swirler to move.

The combustion section of any preceding clause, wherein the swirler includes at least one of a vortex generator, a wall, or an airfoil configured to cause the swirler to move.

The combustion section of any preceding clause, wherein the swirler is axially moveable to vary a mixing length of the fuel nozzle.

The combustion section of any preceding clause, wherein the mixing length is maximized during a high-load condition of the combustion section.

The combustion section of any preceding clause, wherein the mixing length is minimized during a low-load condition of the combustion section.

The combustion section of any preceding clause, wherein the swirler is included in a plurality of swirlers, with a projection of the body centerline of at least two swirlers of the plurality of swirlers intersecting at an intersection point.

The combustion section of any preceding clause, wherein the intersection point is provided within the central channel.

The combustion section of any preceding clause, wherein the central channel includes a nozzle centerline, and a projection of the body centerline from a downstream end of the swirler intersects the nozzle centerline at a swirler angle.

The combustion section of any preceding clause, wherein the swirler angle has an absolute value of greater than or equal to 120 degrees and less than or equal to 180 degrees.

The combustion section of any preceding clause, wherein the fuel nozzle comprises a fuel channel orifice opening to the central channel at a fuel orifice.

The combustion section of any preceding clause, wherein the fuel orifice is provided downstream of the swirler.

The combustion section of any preceding clause, wherein the fuel channel receives a flow of hydrogen fuel.

The combustion section of any preceding clause, wherein the central channel includes a nozzle centerline, and the fuel nozzle body includes a conic section defined by a region of the fuel nozzle body that converges radially inward towards the nozzle centerline.

The combustion section of any preceding clause, wherein the fuel channel orifice is provided along the conic surface.

The combustion section of any preceding clause, wherein the fuel nozzle orifice exhausts a flow of fluid axially towards the swirler, with respect to the centerline.

The combustion section of any preceding clause, wherein the wall is a dome wall.

The turbine engine of any preceding clause, wherein the second swirler is provided axially forward of the first swirler with respect to the centerline.

The combustion section of any preceding clause, wherein the swirler has a body centerline with at least a portion of the fuel channel extending along the body centerline.

The combustion section of any preceding clause, wherein the swirler includes a helical vane wrapping circumferentially about the body axis.

The combustion section of any preceding clause, wherein the fuel orifice is spaced radially outward from the body centerline.

The combustion section of any preceding clause, wherein the swirler extends between a first end and a second end downstream of the first end, with the fuel orifice being located along the second end.

The combustion section of any preceding clause, wherein the swirler extends between a first end and a second end downstream of the first end, with the fuel orifice being located between the first end and the second end.

The combustion section of any preceding clause, wherein the swirler is circumferentially moveable about the body axis.

The combustion section of any preceding clause, wherein the fuel orifice is oriented to cause the swirler to move circumferentially about the body axis when a flow of fuel is emitted from the fuel orifice.

The combustion section of any preceding clause, wherein the fuel outlet is provided axially aft of the swirler.

The combustion section of any preceding clause, wherein the fuel outlet is axially aligned with a respective portion of the swirler.

The combustion section of any preceding clause, wherein the fuel nozzle comprises a fuel supply channel extending through the interior wall.

The combustion section of any preceding clause, wherein the swirler channel is an annular channel.

The combustion section of any preceding clause, wherein the plane of movement is axially with respect to the body centerline.

The combustion section of any preceding clause, wherein the plane of movement is circumferentially with respect to the body centerline.

The combustion section of any preceding clause, wherein the swirler is moveable through an actuator.

The combustion section of any preceding clause, wherein the swirler is a first swirler included within a set of swirlers, the set of swirlers including ga second swirler that is stationary.

A combustion section for a turbine engine, the combustion section comprising a wall at least partially forming a combustion chamber, and a fuel nozzle extending through a respective portion of the wall, the fuel nozzle having a fuel nozzle body defining a central channel and a fuel nozzle centerline, the central channel opening to the combustion chamber at a fuel nozzle outlet, and a swirler provided along the fuel nozzle body and extending into the central channel, the swirler having a set of helical vanes wrapped circumferentially about the fuel nozzle centerline greater than or equal to $\pi/2$ radians between a first end and a second end, axially opposing the first end.

The combustion section of any preceding clause, wherein the fuel nozzle comprises a fuel channel extending through the set of helical vanes and having a fuel jet opening to a portion of the central channel downstream of the second end.

The combustion section of any preceding clause, wherein the fuel jet is located on the swirler.

The combustion section of any preceding clause, wherein the swirler comprises a protrusion that is a localized raised surface of an outer wall of a helical vane of the set of helical vanes, with the fuel jet being located along a distal end of the protrusion.

The combustion section of any preceding clause, wherein the fuel nozzle comprises a fluid channel having a fluid jet located on the protrusion and opening to a portion of the central channel downstream of the swirler.

The combustion section of any preceding clause, wherein the fuel channel circumscribes the fluid channel within the protrusion.

The combustion section of any preceding clause, wherein the fuel channel emits a flow of gaseous fuel through the fuel jet, and the fluid channel emits one of a flow of liquid fuel, or a flow of steam through the fluid jet.

The combustion section of any preceding clause, wherein the set of helical vanes includes a plurality of helical vanes, each of the set of helical vanes terminating radially prior to the fuel nozzle centerline to form a gap between radially opposing portions of the set of helical vanes.

The combustion section of any preceding clause, wherein a hydraulic diameter of the gap is in a range from greater than or equal to 5% of a diameter of the swirler measured perpendicular to the fuel nozzle centerline and less than or equal to 20% of the diameter of the swirler measured perpendicular to the fuel nozzle centerline.

The combustion section of any preceding clause, wherein the swirler generates a first flow of swirled air downstream of the second end, the swirler comprises a protrusion that is a localized raised surface of an outer wall of a helical vane of the set of helical vanes, with the protrusion generating a second flow of swirled air downstream of the second end, and the first flow of swirled air and the second flow of swirled air collectively form a cumulative flow of swirled air within the central channel, with the first flow of swirled air having a larger mass flow rate than the second flow of swirled air.

The combustion section of any preceding clause, wherein the set of helical vanes includes a plurality of helical vanes, with each helical vane of the set of helical vanes extending from a respective portion of the fuel nozzle body.

The combustion section of any preceding clause, wherein the swirler comprises a vane hub located within the central channel, with each helical vane of the set of helical vanes extending radially between the vane hub and the respective portion of the fuel nozzle body.

The combustion section of any preceding clause, wherein the fuel nozzle body comprises an inner surface defining a perimeter of the central channel, and the fuel nozzle further comprises a centerbody spaced radially inwardly from the inner surface and extending through a respective portion of the central channel.

The combustion section of any preceding clause, wherein set of helical vane extends outwardly from the centerbody.

The combustion section of any preceding clause, wherein the set of helical vanes includes a plurality of helical vanes, the set of helical vanes having a subset of first helical vanes extending outwardly from the centerbody, and a subset of second helical vanes extending inwardly from the inner surface.

The combustion section of any preceding clause, wherein the centerbody further comprises a set of centerbody fluid jets opening to a portion of the central channel downstream of the swirler.

The combustion section of any preceding clause, wherein the wall includes a bluff area defined as a surface area of the wall confronting the combustion chamber, the fuel nozzle having a flow area defined as a surface area of the fuel nozzle outlet, and a ratio between the bluff area and the flow area is greater than or equal to 0.01 and less than or equal to 10.

The combustion section of any preceding clause, wherein the fuel nozzle is configured to feed a fuel air mixture to the combustion chamber, the fuel air mixture having a fuel to air ratio of greater than or equal to 0.005 and less than or equal to 0.060.

The combustion section of any preceding clause, wherein the fuel nozzle comprises an axially forwardmost fuel jet configured to inject a flow of fuel into the central channel, a mixing length is defined as an axial distance with respect to the fuel nozzle centerline between the axially forwardmost fuel jet and the fuel nozzle outlet, the fuel nozzle outlet defines a hydraulic exit diameter, and a ratio of the mixing length to the hydraulic exit diameter is greater than or equal to 0 and less than or equal to 200.

The combustion section of any preceding clause, wherein the fuel nozzle comprises a fuel channel opening to the central channel at a fuel jet, and the fuel channel is configured to feed a flow of hydrogen-containing fuel to the central channel.

A turbine engine comprising: a compressor section, a combustion section, and a turbine section in serial flow arrangement, with the combustion section comprising a wall at least partially forming a combustion chamber, and a fuel nozzle extending through a respective portion of the wall, the fuel nozzle having a fuel nozzle body defining a central channel and a fuel nozzle centerline, the central channel opening to the combustion chamber at a fuel nozzle outlet, and a swirler provided along the fuel nozzle body and extending into the central channel, the swirler having a set of helical vanes wrapped circumferentially about the fuel nozzle centerline greater than or equal to $\pi/2$ radians between a first end and a second end, axially opposing the first end.

The turbine engine of any preceding clause, wherein the fuel nozzle comprises a fuel channel extending through the set of helical vanes and having a fuel jet opening to a portion of the central channel downstream of the second end.

The turbine engine of any preceding clause, wherein the fuel jet is located on the swirler.

The turbine engine of any preceding clause, wherein the swirler comprises a protrusion that is a localized raised surface of an outer wall of a helical vane of the set of helical vanes, with the fuel jet being located along a distal end of the protrusion.

The turbine engine of any preceding clause, wherein the fuel nozzle comprises a fluid channel having a fluid jet located on the protrusion and opening to a portion of the central channel downstream of the swirler.

The turbine engine of any preceding clause, wherein the fuel channel circumscribes the fluid channel within the protrusion.

The turbine engine of any preceding clause, wherein the fuel channel emits a flow of gaseous fuel through the fuel jet, and the fluid channel emits one of a flow of liquid fuel, or a flow of steam through the fluid jet.

The turbine engine of any preceding clause, wherein the set of helical vanes includes a plurality of helical vanes, each of the set of helical vanes terminating radially prior to the fuel nozzle centerline to form a gap between radially opposing portions of the set of helical vanes.

The turbine engine of any preceding clause, wherein a hydraulic diameter of the gap is in a range from greater than or equal to 5% of a diameter of the swirler measured perpendicular to the fuel nozzle centerline and less than or equal to 20% of the diameter of the swirler measured perpendicular to the fuel nozzle centerline.

The turbine engine of any preceding clause, wherein the swirler generates a first flow of swirled air downstream of the second end, the swirler comprises a protrusion that is a localized raised surface of an outer wall of a helical vane of the set of helical vanes, with the protrusion generating a second flow of swirled air downstream of the second end, and the first flow of swirled air and the second flow of swirled air collectively form a cumulative flow of swirled air within the central channel, with the first flow of swirled air having a larger mass flow rate than the second flow of swirled air.

The turbine engine of any preceding clause, wherein the set of helical vanes includes a plurality of helical vanes, with each helical vane of the set of helical vanes extending from a respective portion of the fuel nozzle body.

The turbine engine of any preceding clause, wherein the swirler comprises a vane hub located within the central channel, with each helical vane of the set of helical vanes extending radially between the vane hub and the respective portion of the fuel nozzle body.

The turbine engine of any preceding clause, wherein the fuel nozzle body comprises an inner surface defining a perimeter of the central channel, and the fuel nozzle further comprises a centerbody spaced radially inwardly from the inner surface and extending through a respective portion of the central channel.

The turbine engine of any preceding clause, wherein set of helical vane extends outwardly from the centerbody.

The turbine engine of any preceding clause, wherein the set of helical vanes includes a plurality of helical vanes, the set of helical vanes having a subset of first helical vanes extending outwardly from the centerbody, and a subset of second helical vanes extending inwardly from the inner surface.

The turbine engine of any preceding clause, wherein the centerbody further comprises a set of centerbody fluid jets opening to a portion of the central channel downstream of the swirler.

The turbine engine of any preceding clause, wherein the wall includes a bluff area defined as a surface area of the wall confronting the combustion chamber, the fuel nozzle having a flow area defined as a surface area of the fuel nozzle outlet, and a ratio between the bluff area and the flow area is greater than or equal to 0.01 and less than or equal to 10.

The turbine engine of any preceding clause, wherein the fuel nozzle is configured to feed a fuel air mixture to the combustion chamber, the fuel air mixture having a fuel to air ratio of greater than or equal to 0.005 and less than or equal to 0.060.

The turbine engine of any preceding clause, wherein the fuel nozzle comprises an axially forwardmost fuel jet configured to inject a flow of fuel into the central channel, a mixing length is defined as an axial distance with respect to the fuel nozzle centerline between the axially forwardmost fuel jet and the fuel nozzle outlet, the fuel nozzle outlet defines a hydraulic exit diameter, and a ratio of the mixing length to the hydraulic exit diameter is greater than or equal to 0 and less than or equal to 200.

The turbine engine of any preceding clause, wherein the fuel nozzle comprises a fuel channel opening to the central channel at a fuel jet, and the fuel channel is configured to feed a flow of hydrogen-containing fuel to the central channel.

What is claimed is:

1. A combustion section for a turbine engine, the combustion section comprising:

a wall at least partially forming a combustion chamber; and a fuel nozzle that opens to the combustion chamber through the wall, the fuel nozzle configured to deliver hydrogen fuel to the combustion chamber and comprising:

a fuel nozzle body defining a central channel exhausting into the combustion chamber at a fuel nozzle outlet; and a swirler provided within the central channel, the swirler having a body centerline and a helical vane extending from the body centerline, the helical vane wrapped circumferentially about the body centerline greater than or equal to $\pi/2$ radians between a first end and a second end, axially opposing the first end, of the helical vane, wherein the fuel nozzle includes a fuel channel extending through a portion of the swirler, the fuel channel including a fuel orifice opening into the central channel and being provided along the swirler, wherein the helical vane includes at least two helical vanes and the fuel orifice includes a set of fuel orifices, with each second end of the at least two helical vanes having at least one fuel orifice of the set of fuel orifices.

2. The combustion section of claim 1, wherein the at least two helical vanes form at least a double helix.

3. The combustion section of claim 2, wherein the second end of a first vane of the at least two helical vanes is axially spaced an axial distance, with respect to the body centerline, from the second end of a second vane of the at least two helical vanes.

4. The combustion section of claim 2, wherein the first end and the second end of a first helical vane of the at least two helical vanes axially corresponds to the first end and the second end of a second helical vane of the at least two helical vanes.

5. The combustion section of claim 1, wherein the at least one fuel orifice of the set of fuel orifices is provided along the second end of the at least two helical vanes.

6. The combustion section of claim 1, wherein the set of fuel orifices includes a fuel orifice provided along a portion of the helical vane axially between the first end and the second end.

7. The combustion section of claim 1, wherein the set of fuel orifices includes a fuel orifice provided along the body centerline.

8. The combustion section of claim 1, wherein:

the swirler is a first swirler included in a set of swirlers, the first swirler including the helical vane, the at least two helical vanes wrapped in a first circumferential direction, with respect to the body centerline, the body centerline being a first body centerline of the first swirler; and a second swirler, separate from the first swirler, includes a second helical vane wrapped in a second circumferential direction, opposite the first circumferential direction, with respect to a second body centerline of the second swirler.

9. The combustion section of claim 8, wherein the first swirler is provided downstream the second swirler.

10. The combustion section of claim 8, wherein the first swirler is provided radially adjacent to the second swirler, with respect to the first body centerline of the first swirler.

11. The combustion section of claim 1, wherein the swirler includes a vortex generator provided along one of the at least two helical vanes.

12. The combustion section of claim 1, wherein the swirler converges radially inward, with respect to the body centerline, from an upstream portion and to a downstream portion of the swirler.

13. The combustion section of claim 1, wherein the fuel nozzle body includes a nozzle centerline, and the swirler is axially offset from or coincides with the fuel nozzle outlet.

14. The combustion section of claim 1, wherein the swirler terminates at the fuel nozzle outlet.

15. The combustion section of claim 1, wherein the swirler is moveable.

16. A combustion section for a turbine engine, the combustion section comprising:

a wall at least partially forming a combustion chamber; and a fuel nozzle that opens to the combustion chamber through the wall, the fuel nozzle configured to deliver hydrogen fuel to the combustion chamber and comprising:

a fuel nozzle body defining a central channel exhausting into the combustion chamber at a fuel nozzle outlet; and a swirler provided within the central channel, the swirler having a body centerline and a helical vane extending from the body centerline, the helical vane wrapped circumferentially about the body centerline greater than or equal to $\pi/2$ radians between a first end and a second end, axially opposing the first end, of the helical vane, wherein the swirler is a first swirler included in a set of swirlers, the first swirler including the helical vane, the helical vane being a first helical vane wrapped in a first circumferential direction, with respect to the body centerline, the body centerline being a first body centerline of the first swirler; and a second swirler, separate from the first swirler, includes a second helical vane wrapped in a second circumferential direction, opposite the first circumferential direction, with respect to a second body centerline of the second swirler, wherein the fuel nozzle includes an interior wall extending through the central channel and splitting the central channel into a first swirler channel and a second swirler channel, the first swirler being provided within the first swirler channel and the second swirler being provided within the second swirler channel.

17. The combustion section of claim 16, wherein the interior wall extends into the central channel to the fuel nozzle outlet.

18. The combustion section of claim 16, wherein the first swirler is configured to direct a flow of compressed air in a first circumferential direction, and wherein the second swirler is configured to direct a flow of compressed air in a second circumferential direction, opposite the first circumferential direction.

* * * * *